United States Patent
Faxér et al.

(10) Patent No.: US 12,101,140 B2
(45) Date of Patent: Sep. 24, 2024

(54) CHANNEL STATE INFORMATION FEEDBACK IN A WIRELESS COMMUNICATION SYSTEM

(71) Applicant: Telefonaktiebolaget LM Ericsson (publ), Stockholm (SE)

(72) Inventors: Sebastian Faxér, Stockholm (SE); Shiwei Gao, Nepean (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 655 days.

(21) Appl. No.: 17/269,818

(22) PCT Filed: Aug. 13, 2019

(86) PCT No.: PCT/IB2019/056877
§ 371 (c)(1),
(2) Date: Feb. 19, 2021

(87) PCT Pub. No.: WO2020/039307
PCT Pub. Date: Feb. 27, 2020

(65) Prior Publication Data
US 2021/0336660 A1    Oct. 28, 2021

Related U.S. Application Data

(60) Provisional application No. 62/720,006, filed on Aug. 20, 2018.

(51) Int. Cl.
*H04B 7/0417*    (2017.01)
*H04B 7/0456*    (2017.01)
*H04B 7/06*    (2006.01)

(52) U.S. Cl.
CPC ........ *H04B 7/0417* (2013.01); *H04B 7/0486* (2013.01); *H04B 7/0626* (2013.01); *H04B 7/063* (2013.01); *H04B 7/0632* (2013.01)

(58) Field of Classification Search
CPC ............... H04B 7/0417; H04B 7/0486; H04B 7/0626; H04B 7/063; H04B 7/0632;
(Continued)

(56) References Cited

U.S. PATENT DOCUMENTS 11,522,587 B2 * 12/2022 Li ..................... H04B 7/0617
2012/0207105 A1 * 8/2012 Geirhofer ............. H04L 5/0032
370/329

(Continued)

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.2.1, Jun. 2018, 1-303.
(Continued)

*Primary Examiner* — Jean A Gelin
(74) *Attorney, Agent, or Firm* — Murphy, Bilak & Homiller, PLLC

(57) ABSTRACT

A wireless device (14) is configured for reporting channel state information, CSI, feedback (18) based on a CSI reference signal, CSI-RS, (16) received on a CSI-RS resource (11) of one or more CSI-RS ports. If the wireless device (14) is not configured with a parameter that indicates, for the CSI-RS resource (11), which sets of one or more CSI-RS port indices (17) are associated with which transmission ranks (15), the wireless device (14) is configured to assume, for the CSI-RS resource (11), that certain sets of one or more CSI-RS port indices (17) are associated with certain transmission ranks (15).

17 Claims, 21 Drawing Sheets

(58) Field of Classification Search
CPC ............... H04B 7/0456; H04B 7/0645; H04B 7/0639; H04B 7/0697; H04B 17/336
USPC ........................................................ 370/329
See application file for complete search history.

(56) References Cited

U.S. PATENT DOCUMENTS

| | | | | |
|---|---|---|---|---|
| 2013/0322276 | A1* | 12/2013 | Pelletier | H04W 24/10 370/252 |
| 2014/0010126 | A1* | 1/2014 | Sayana | H04J 3/1694 370/336 |
| 2014/0056156 | A1* | 2/2014 | Jongren | H04B 7/0456 370/252 |
| 2014/0376485 | A1* | 12/2014 | Lee | H04L 5/0053 370/329 |
| 2015/0172950 | A1* | 6/2015 | Chen | H04L 5/0048 370/252 |
| 2015/0236828 | A1* | 8/2015 | Park | H04L 5/001 375/340 |
| 2016/0036571 | A1* | 2/2016 | Park | H04L 5/0048 370/330 |
| 2016/0316389 | A1* | 10/2016 | Kim | H04B 17/345 |
| 2016/0330630 | A1* | 11/2016 | Yoo | H04L 1/16 |
| 2017/0111098 | A1* | 4/2017 | Kim | H04B 7/0632 |
| 2017/0208568 | A1* | 7/2017 | Nam | H04W 72/23 |
| 2018/0049047 | A1* | 2/2018 | Lin | H04L 27/2602 |
| 2018/0248607 | A1* | 8/2018 | Park | H04B 7/0632 |
| 2018/0302139 | A1* | 10/2018 | Huang | H04B 7/063 |
| 2019/0044599 | A1* | 2/2019 | Kakishima | H04B 7/0632 |
| 2019/0182697 | A1* | 6/2019 | Zhang | H04B 7/088 |
| 2019/0326973 | A1* | 10/2019 | Kim | H04B 7/0417 |
| 2019/0335474 | A1* | 10/2019 | Tang | H04B 7/0695 |
| 2020/0112355 | A1* | 4/2020 | Park | H04L 5/0094 |
| 2020/0304190 | A1* | 9/2020 | Na | H04B 7/0695 |
| 2020/0322013 | A1* | 10/2020 | Gao | H04L 5/0051 |
| 2021/0067215 | A1* | 3/2021 | Song | H04L 5/0051 |

OTHER PUBLICATIONS

3GPP, "3GPP TS 38.214 V15.1.0 (Mar. 2018)", 3rd Generation Partnership Project; Technical Specification Group Radio Access Network; NR; Physical layer procedures for data (Release 15), Mar. 2018, 1-77.

Ericsson, "On remaining details of CSI measurement", 3GPP TSG-RAN WG1 #91, R1-1720733, Reno, USA, Nov. 27-Dec. 1, 2017, pp. 1-10.

Nokia et al., "On the channel reciprocity support for CSI acquisition", 3GPP TSG RAN WG1 #90bis, R1-1718706, Prague, Czech Republic, Nokia, Nokia Shanghai Bell, Oct. 9-13, 2017, pp. 1-5.

* cited by examiner

FOR EACH OF ONE OR MORE SUPPORTED TRANSMISSION RANKS, DETERMINING ONE OR MORE CSI-RS PORTS IN THE CSI-RS RESOURCE THAT ARE ASSOCIATED BY DEFAULT WITH THE SUPPORTED TRANSMISSION RANK AND CALCULATING A CQI FOR THE SUPPORTED TRANSMISSION RANK USING THE DETERMINED ONE OR MORE CSI-RS PORTS
200

SELECTING, FROM THE ONE OR MORE SUPPORTED TRANSMISSION RANKS AND THE CQI RESPECTIVELY CALCULATED FOR THE ONE OR MORE SUPPORTED TRANSMISSION RANKS, A TRANSMISSION RANK AND A CQI CALCULATED FOR THAT RANK TO REPORT FOR THE CSI-RS RESOURCE
210

TRANSMITTING TO A RADIO NETWORK NODE CSI FEEDBACK FOR THE CSI-RS RESOURCE, WHEREIN THE CSI FEEDBACK INCLUDES THE SELECTED TRANSMISSION RANK AND CQI
220

RECEIVING FROM THE RADIO NETWORK NODE A DATA TRANSMISSION WHOSE TRANSMISSION PARAMETERS ARE DETERMINED BASED ON THE CSI FEEDBACK AND THE ONE OR MORE CSI-RS PORTS THAT ARE ASSOCIATED BY DEFAULT WITH THE TRANSMISSION RANK INCLUDED IN THE CSI FEEDBACK
230

Figure 2

```
┌─────────────────────────────────────────────────────────────┐
│  DETERMINING A PRECODER FOR THE CSI-RS FROM AN UPLINK       │
│  SOUNDING REFERENCE SIGNAL RECEIVED FROM THE WIRELESS DEVICE│
│         AND APPLYING THE PRECODER TO THE CSI-RS             │
│                            315                              │
└─────────────────────────────────────────────────────────────┘
                              │
                              ▼
┌─────────────────────────────────────────────────────────────┐
│   BEAMFORMING THE CSI-RS SPECIFICALLY FOR THE WIRELESS DEVICE│
│                            305                              │
└─────────────────────────────────────────────────────────────┘
                              │
                              ▼
┌─────────────────────────────────────────────────────────────┐
│    TRANSMITTING, TO A WIRELESS DEVICE, A CHANNEL STATE       │
│  INFORMATION REFERENCE SIGNAL, CSI-RS, OVER A CSI-RS RESOURCE│
│              OF ONE OR MORE CSI-RS PORTS                     │
│                            300                              │
└─────────────────────────────────────────────────────────────┘
                              │
                              ▼
┌─────────────────────────────────────────────────────────────┐
│ RECEIVING FROM THE WIRELESS DEVICE CHANNEL STATE INFORMATION,│
│ CSI, FEEDBACK BASED ON THE CSI-RS SIGNAL RECEIVED ON THE CSI-RS│
│  RESOURCE, WHEREIN THE CSI FEEDBACK INCLUDES A TRANSMISSION │
│        RANK AND A CHANNEL QUALITY INDICATOR, CQI             │
│                            310                              │
└─────────────────────────────────────────────────────────────┘
                              │
                              ▼
┌─────────────────────────────────────────────────────────────┐
│  DETERMINING ONE OR MORE CSI-RS PORTS IN THE CSI-RS RESOURCE │
│    THAT ARE ASSOCIATED BY DEFAULT WITH THE INDICATED         │
│                    TRANSMISSION RANK                         │
│                            320                              │
└─────────────────────────────────────────────────────────────┘
                              │
                              ▼
┌─────────────────────────────────────────────────────────────┐
│ DETERMINING TRANSMISSION PARAMETERS OF A DATA TRANSMISSION   │
│  BASED ON THE CSI FEEDBACK AND THE ONE OR MORE CSI-RS PORTS  │
│                         DETERMINED                           │
│                            330                              │
└─────────────────────────────────────────────────────────────┘
                              │
                              ▼
┌─────────────────────────────────────────────────────────────┐
│   TRANSMITTING THE DATA TRANSMISSION WITH THE DETERMINED     │
│ TRANSMISSION PARAMETERS, E.G., AND ON THE DETERMINED ONE OR  │
│                     MORE CSI-RS PORTS                        │
│                            340                              │
└─────────────────────────────────────────────────────────────┘
```

Figure 3

CHANNEL STATE INFORMATION FEEDBACK IN A WIRELESS COMMUNICATION SYSTEM

TECHNICAL FIELD

The present application relates generally to a wireless communication system, and relates more particularly to channel state information feedback in such a system.

BACKGROUND

A Multiple-Input Multiple-Output (MIMO) wireless communication system uses multiple transmit and receive antennas. MIMO exploits the spatial dimension of the communication channel to send multiple information-carrying signals in parallel on at least partly overlapping time, frequency, and code resources. Precoding of the transmit signal adapts the phase and amplitudes of the signal to better fit the current channel conditions and thereby realize significant performance gains.

MIMO precoding may include antenna port virtualization. An antenna port in this regard is a "virtual" antenna, which is defined by an antenna port-specific reference signal. An antenna port is defined such that the channel over which a symbol on the antenna port is conveyed can be inferred from the channel over which another symbol on the same antenna port is conveyed. The signal corresponding to an antenna port may be transmitted by one or more physical antennas or transmission points.

To support precoding, the transmitter transmits a so-called channel state information (CSI) reference signal (CSI-RS) from one or more antenna ports. The antenna ports from which CSI-RS are transmitted are referred to as CSI-RS ports. Different CSI-RS ports may be differentiated with difference CSI-RS port indices. By measuring on a CSI-RS, the receiver can estimate the effective channel the CSI-RS is traversing, including the radio propagation channel, antenna gains, and any possible antenna virtualizations. A CSI-RS port may be precoded so that it is virtualized over multiple physical antenna ports; that is, the CSI-RS port can be transmitted on multiple physical antenna ports, possibly with different gains and phases.

CSI-RS may be transmitted on one or more so-called CSI-RS resources. A CSI-RS resource is a pattern of resource elements (e.g., time-frequency resources) on which a particular CSI-RS configuration is transmitted. By configuring different CSI-RS resources (e.g., one for each transmission point), the receiver can estimate the effective channels for each CSI-RS port by CSI-RS measurements on the corresponding CSI-RS resource.

Based on the CSI-RS measurement, the receiver reports CSI feedback to the transmitter. The CSI feedback may for instance be per CSI-RS resource, corresponding to separate reporting of CSI for each of a set of CSI-RS resources. Typically though, CSI is only fed back for a single, preferred, CSI-RS resource and if multiple CSI-RS resources are configured, the transmitter of the CSI feedback initially performs a CSI-RS resource selection using a CSI-RS resource indicator (CRI). The CSI feedback may include for instance a channel quality indicator (CQI) and a transmission rank, where the transmission rank represents the number of transmission layers (or information-carrying signals) that can be transmitted in parallel given the current channel conditions.

In a PMI-based feedback scheme, the CSI feedback may also include a precoding matrix indicator (PMI) which indicates a precoding matrix that the receiver recommends for the transmitter to use for precoding. If nested-rank precoding is used, the codebook of possible precoding matrices for a lower transmission rank is formed by a subset of the higher rank codebook vectors.

By contrast, in a non-PMI feedback scheme, the CSI feedback does not include a PMI. Indeed, in this scheme, the transmitter transmits CSI-RS that is already precoded with the intended precoding matrix, meaning that the CSI feedback need not include any PMI. Instead, the precoding matrix may be derived based on uplink sounding, assuming reciprocity between the uplink and downlink channels.

Problematically, though, the radio resource management signaling for configuring non-PMI feedback can be quite heavy. Challenges exist therefore in reducing uplink control signaling using a non-PMI feedback scheme, without meaningfully increasing the signaling overhead needed to configure that feedback scheme.

SUMMARY

According to some embodiments herein, a wireless device is configured under some circumstances to make certain assumptions for channel state information (CSI) feedback reporting. The assumptions in this regard may reflect a default configuration which need not be signalled to the wireless device. Some embodiments may thereby effectively reduce the radio resource management signalling overhead needed to configure CSI feedback reporting.

More particularly, the wireless device under some circumstances may be configured (e.g., via downlink control signalling) with a so-called port indication parameter. The port indication parameter indicates for, a CSI reference signal (CSI-RS) resource, which sets of one or more CSI-RS port indices are associated with which transmission ranks. The port indication parameter may thereby indicate which CSI-RS port(s) the wireless device is to measure on, for each possible rank hypothesis for channel quality indication (CQI) calculation purposes. By allowing flexible association between CSI-RS ports and transmission ranks, the port indication parameter may be used under circumstances where CSI-RS resources are shared between wireless devices and/or rank-nested precoding is not used.

Under other circumstances, though, such as where CSI-RS resources need not be shared between wireless devices and where rank-nested precoding is used, the wireless device may not be configured with the port indication parameter. Instead, the wireless device may advantageously assume that, for a given CSI-RS resource, certain sets of one or more CSI-port indices are associated (e.g., by default) with certain transmission ranks. For example, the wireless device may assume that, for each of one or more supported transmission ranks except the highest supported transmission rank, a set of one or more CSI-RS ports associated with the supported transmission rank is a proper subset of the set of one or more CSI-RS ports associated with a higher supported transmission rank. In these and other embodiments, then, the wireless device's assumption obviates the need for control signaling to configure the wireless device with the port indication parameter. Some embodiments may thereby effectively reduce the downlink control signalling overhead needed to configure CSI feedback reporting.

More particularly, embodiments herein include a method performed by a wireless device for reporting channel state information, CSI, feedback based on a CSI reference signal, CSI-RS, received on a CSI-RS resource of one or more CSI-RS ports. The method may comprise, if the wireless device is not configured with a parameter that indicates, for the CSI-RS resource, which sets of one or more CSI-RS port indices are associated with which transmission ranks, assuming, for the CSI-RS resource, that certain sets of one or more CSI-RS port indices are associated with certain transmission ranks. Such assuming may mean for instance that the wireless device operates based on an assumed condition or association, namely that, for the CSI-RS resource, certain sets of one or more CSI-RS port indices are associated with certain transmission ranks. Regardless, assuming this may comprise for instance assuming, for each of one or more supported transmission ranks except the highest supported transmission rank, that a set of one or more CSI-RS ports associated with the supported transmission rank is a proper subset of the set of one or more CSI-RS ports associated with a higher supported transmission rank. Alternatively or additionally, assuming this may comprise assuming, for each rank v of one or more supported transmission ranks, that a set of one or more CSI-RS ports associated with the rank v have one or more respective CSI-RS port indices of 0, . . . , v−1.

Regardless, the method in some embodiments may also include, when calculating a channel quality indicator (CQI) for a transmission rank, using the one or more ports assumed for that transmission rank for the CSI-RS resource.

In some embodiments, the method may further comprise selecting a transmission rank and a CQI calculated for that rank to report for the CSI-RS resource. In some embodiments, the method then includes transmitting to a radio network node CSI feedback for the CSI-RS resource, wherein the CSI feedback includes the selected transmission rank and CQI.

In some embodiments, the method may further include receiving from the radio network node a data transmission whose transmission parameters are determined based on the CSI feedback and the one or more CSI-RS ports that are associated (e.g., by default) with the transmission rank included in the CSI feedback.

In any of these embodiments, the CSI-RS feedback may be non-precoder matrix indicator (non-PMI) CSI feedback such that the CSI-RS feedback does not indicate a PMI.

In any of these embodiments, the CSI-RS resource may be dedicated to the wireless device. Alternatively or additionally, CSI-RS resource may be aperiodically triggered.

In some embodiments, the CSI-RS is beamformed specifically for the wireless device.

In any of these embodiments, the method may comprise, for each of one or more supported transmission ranks, applying an identity matrix precoder on the one or more CSI-RS ports in the CSI-RS resource that are associated by default with the supported transmission rank and calculating the CQI for the supported transmission rank using the determined one or more CSI-RS ports, with the identity matrix precoder applied.

Other embodiments herein include a method performed by a radio network node (e.g., a base station). The method may comprise transmitting, to a wireless device, a channel state information reference signal (CSI-RS) on a CSI-RS resource of one or more CSI-RS ports. The method also includes receiving from the wireless device channel state information (CSI) feedback based on the CSI-RS transmitted on the CSI-RS resource, wherein the CSI feedback includes a transmission rank and a channel quality indicator (CQI). The method may further include determining one or more CSI-RS ports in the CSI-RS resource that are assumed to be associated with the transmission rank included in the CSI feedback.

In some embodiments, the method may also include determining transmission parameters of a data transmission based on the CSI feedback and the one or more CSI-RS ports determined. The method in this case may also include transmitting the data transmission with the determined transmission parameters.

The method may alternatively or additionally include beamforming the CSI-RS specifically for the wireless device. In some embodiments, the method alternatively or additionally includes determining a precoder for the CSI-RS from an uplink sounding reference signal received from the wireless device and applying the precoder to the CSI-RS.

In some embodiments, the method may comprise determining, from an uplink sounding reference signal received from the wireless device, a number of the one or more CSI-RS ports of the CSI-RS resource on which to transmit the CSI-RS.

In some embodiments, the method comprises, for each of the one or more supported transmission ranks, refraining from configuring the wireless device via control signaling with a parameter indicating one or more CSI-RS ports in the CSI-RS resource that are associated with the supported transmission rank.

In any of these embodiments, the CSI-RS feedback may be non-precoder matrix indicator (non-PMI) CSI feedback such that the CSI-RS feedback does not indicate a PMI.

In any of these embodiments, the CSI-RS resource may be dedicated to the wireless device. Alternatively or additionally, CSI-RS resource may be aperiodically triggered.

In some embodiments, for each of the one or more supported transmission ranks except the highest supported transmission rank, the one or more CSI-RS ports in the CSI-RS resource that are associated by default with the supported transmission rank is a proper subset of the one or more CSI-RS ports in the CSI-RS resource that are associated by default with a higher supported transmission rank. Alternatively or additionally, in some embodiments, for each rank v of the one or more supported transmission ranks, the one or more CSI-RS ports in the CSI-RS resource that are associated by default with the rank v have one or more respective CSI-RS port indices of 0, . . . , v−1.

Embodiments herein also include corresponding apparatus, computer programs, and carriers. For example, embodiments include a wireless device for reporting channel state information, CSI, feedback based on a CSI reference signal, CSI-RS, received on a CSI-RS resource of one or more CSI-RS ports. If the wireless device is not configured with a parameter that indicates, for the CSI-RS resource, which sets of one or more CSI-RS port indices are associated with which transmission ranks, the wireless device may be configured (e.g., via processing circuitry) to assume, for the CSI-RS resource, that certain sets of one or more CSI-RS port indices are associated with certain transmission ranks.

Embodiments herein also include a radio network node (e.g., a base station). The radio network node may be configured (e.g., via communication circuitry and processing circuitry) to transmit, to a wireless device, a channel state information reference signal (CSI-RS) on a CSI-RS resource of one or more CSI-RS ports. The radio network node may also be configured to receive from the wireless device channel state information (CSI) feedback based on the CSI-RS transmitted on the CSI-RS resource, wherein the CSI feedback includes a transmission rank and a channel quality indicator (CQI). The radio network node may further be configured to determine one or more CSI-RS ports in the CSI-RS resource that are assumed to be associated with the transmission rank included in the CSI feedback.

BRIEF DESCRIPTION OF THE DRAWINGS

FIG. 2 is a logic flow diagram of a method performed by a wireless device according to some embodiments.

FIG. 3 is a logic flow diagram of a method performed by a radio network node according to some embodiments.

DETAILED DESCRIPTION

Figure 1:
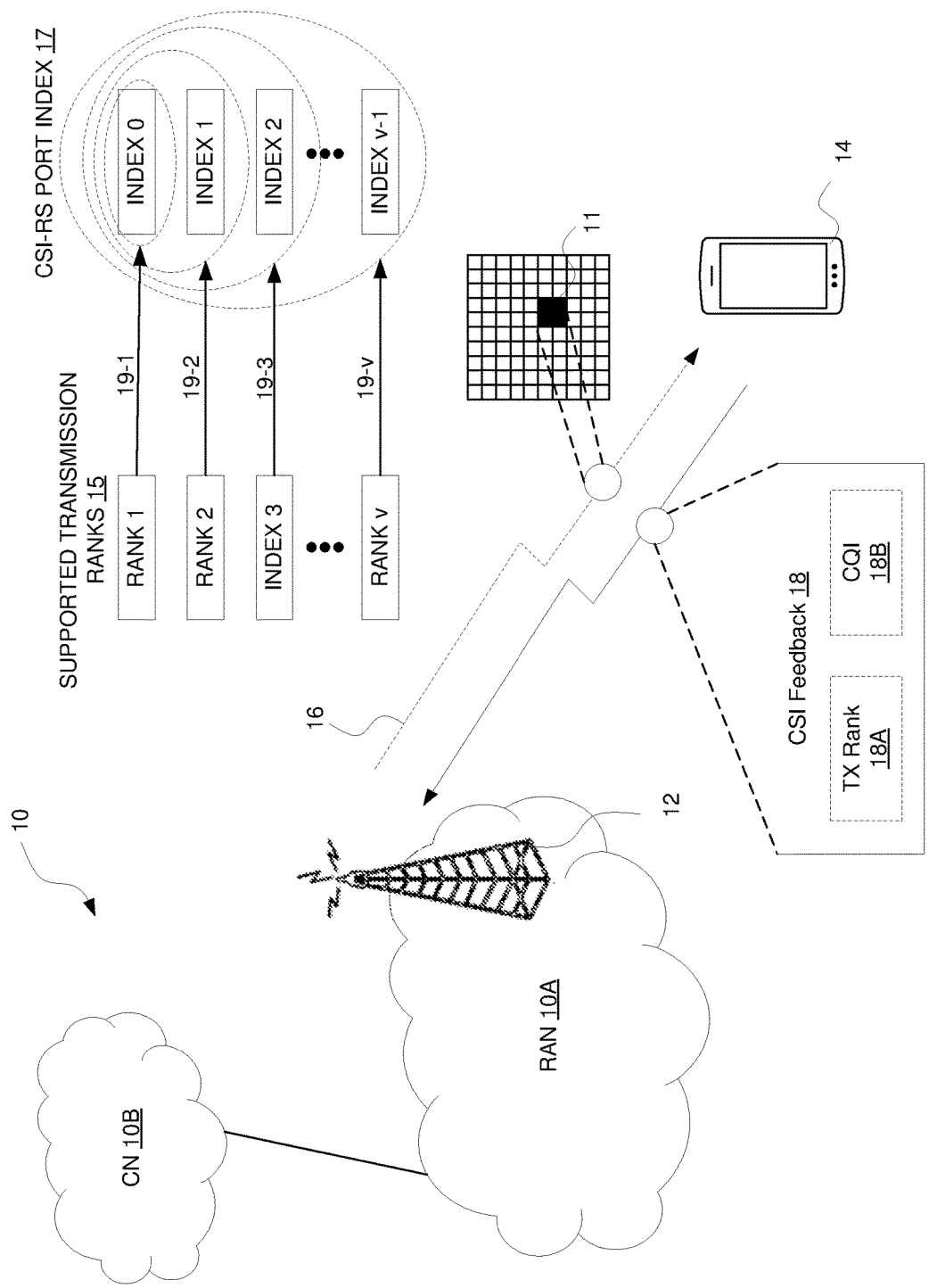
FIG. 1 is a block diagram of a wireless communication system according to some embodiments.

FIG. 1 shows a wireless communication system 10 according to some embodiments. The system 10 includes a radio network node 12 (e.g., a base station) in a radio access network (RAN) 10A of the system 10. The system 10 also includes a wireless device 14 (e.g., a user equipment) configured to wirelessly communicate with the radio network node 12, e.g., for connecting to a core network (CN) 10B of the system 10.

The radio network node 12 may be configured to transmit to the wireless device 14 a channel state information (CSI) reference signal (RS) (CSI-RS) 16 on a CSI-RS resource 11 of one or more CSI-RS ports. The CSI-RS resource 11 may for instance be or correspond to a pattern of resource elements (e.g., time-frequency resources) on which the CSI-RS 16 is transmitted. The CSI-RS resource 11 in some embodiments is dedicated to the wireless device and/or is aperiodically triggered. In some embodiments, the CSI-RS 16 is beamformed specifically for the wireless device 14. The wireless device 14 is configured to correspondingly receive such a CSI-RS 16.

The wireless device 14 as shown is also configured to report CSI feedback 18 based on this CSI-RS 16. The CSI feedback 18 may for instance be non-precoder matrix indication (non-PMI) CSI feedback, e.g., such that the CSI feedback 18 does not include a PMI for indicating a precoder to the radio network node 12. The CSI feedback 18 in this regard may just include a transmission rank 18A and a channel quality indication (CQI) 18B for that transmission rank 18A.

To generate this CSI feedback 18, the wireless device 14 is to measure on certain CSI-RS ports for each possible hypothesis of transmission rank, and then calculate the CQI 18B for that rank hypothesis. Regarding which CSI-RS ports the wireless device 14 is to measure on for different transmission ranks, the wireless device 14 is advantageously configured to assume that, for the CSI-RS resource 11, certain sets of one or more CSI-RS port indices are associated (e.g., by default) with certain transmission ranks. The wireless device 14 may for example be configured to assume this if the wireless device 14 is not otherwise configured (e.g., via control signaling from the radio network node 12) with a parameter (e.g., non-PMI-PortIndication) that indicates, for the CSI-RS resource 11, which sets of one or more CSI-RS port indices are associated with which transmission ranks. Accordingly, if the CSI-RS port indices are indeed to be associated with the transmission ranks according to the assumption, that assumption may thereby obviate the need for configuring the wireless device 14 with this parameter, e.g., so as to obviate the need for transmitting control signaling to the wireless device 14 for such purpose.

In view of the above modifications and variations, FIG. 1 shows one example of how certain sets of one or more CSI-RS port indices may be associated (e.g., by default) with certain transmission ranks under the assumption. As shown, the transmission ranks 15 that the wireless device 14 supports includes ranks 1, 2, 3, . . . v, where v>0. For each rank v, the set of one or more CSI-RS ports that are assumed to be associated with that rank v have one or more respective CSI-RS port indices of 0, . . . , v−1. That is, the wireless device 14 assumes that the set 19-1 which includes CSI-RS port index 0 is associated with rank 1, that the set 19-2 which includes CSI-RS port indices 0 and 1 is associated with rank 2, that the set 19-3 which includes CSI-RS port index 0, 1, and 2 is associated with rank 3, and that the set 19-v which includes CSI-RS port indices 0, . . . , v−1 is associated with rank v. In these and other embodiments, then, for each of one or more supported transmission ranks 15 except the highest supported transmission rank, the set of one or more CSI-RS ports that is associated with the supported transmission rank is a proper subset of the set of one or more CSI-RS ports associated with a higher supported transmission rank. In some embodiments, the number of CSI-RS ports that is associated with the highest transmission rank v is N=v, i.e., there are v CSI-RS ports associated with rank v.

FIG. 2 more particularly depicts a method performed by a wireless device 14 for reporting channel state information (CSI) feedback 18 based on a CSI-RS 16 received on a CSI-RS resource of one or more CSI-RS ports, in accordance with particular embodiments. The method includes, for each of one or more supported transmission ranks, determining one or more CSI-RS ports in the CSI-RS resource that are associated by default with the supported transmission rank and calculating a CQI for the supported transmission rank using the determined one or more CSI-RS ports (Block 200). The method in some embodiments may also include selecting, from the one or more supported transmission ranks and the CQI respectively calculated for the one or more supported transmission ranks, a transmission rank and a CQI calculated for that rank to report for the CSI-RS resource (Block 210). In some embodiments, the method then includes transmitting to a radio network node 12 CSI feedback 18 for the CSI-RS resource, wherein the CSI feedback 18 includes the selected transmission rank 18A and CQI 18B (Block 220).

Note that, in some embodiments, the association is determined in this way by default if (or responsive to determining that) the wireless device 14 is not configured by control signaling (e.g., radio resource control, RRC, signaling) with a parameter (e.g., non-PMI-PortIndication) indicating one or more CSI-RS ports in the CSI-RS resource that are associated with the supported transmission rank. That is, in some embodiments, the method comprises, for each of the one or more supported transmission ranks, determining the one or more CSI-RS ports in the CSI-RS resource that are associated by default with the supported transmission rank, responsive to determining that the wireless device is not configured by control signaling with a parameter indicating one or more CSI-RS ports in the CSI-RS resource that are associated with the supported transmission rank.

In some embodiments, for each of the one or more supported transmission ranks except the highest supported transmission rank, the one or more CSI-RS ports in the CSI-RS resource that are associated by default with the supported transmission rank is a proper subset of the one or more CSI-RS ports in the CSI-RS resource that are associated by default with a higher supported transmission rank. Alternatively or additionally, in some embodiments, for each rank v of the one or more supported transmission ranks, the one or more CSI-RS ports in the CSI-RS resource that are associated by default with the rank v have one or more respective CSI-RS port indices of 0, . . . , v−1.

Also as shown in FIG. 2, in some embodiments, the method may further include receiving from the radio network node 12 a data transmission whose transmission parameters are determined based on the CSI feedback 18 and the one or more CSI-RS ports that are associated by default with the transmission rank included in the CSI feedback 18 (Block 230).

In any of these embodiments, the CSI-RS feedback may be non-precoder matrix indicator (non-PMI) CSI feedback such that the CSI-RS feedback does not indicate a PMI.

In any of these embodiments, the CSI-RS resource may be dedicated to the wireless device. Alternatively or additionally, CSI-RS resource may be aperiodically triggered.

In any of these embodiments, the method may comprise, for each of one or more supported transmission ranks, applying an identity matrix precoder on the one or more CSI-RS ports in the CSI-RS resource that are associated by default with the supported transmission rank and calculating the CQI for the supported transmission rank using the determined one or more CSI-RS ports, with the identity matrix precoder applied.

FIG. 3 depicts a method performed by a radio network node 12 in accordance with other particular embodiments.

The method in some embodiments includes transmitting, to a wireless device 14, a channel state information reference signal (CSI-RS) 16 on a CSI-RS resource of one or more CSI-RS ports (Block 300). Regardless, the method as shown includes receiving from the wireless device 14 channel state information (CSI) feedback 18 based on the CSI-RS signal 16 transmitted on the CSI-RS resource, wherein the CSI feedback 18 includes a transmission rank 18A and a channel quality indicator (CQI) 18B (Block 310). The method further includes determining one or more CSI-RS ports in the CSI-RS resource that are associated (e.g., by default) with the indicated transmission rank (Block 320). This may mean for instance that the radio network node 12 determines one or more CSI-RS ports in the CSI-RS resource that are assumed to be associated with the transmission rank included in the CSI feedback 18.

In some embodiments as shown in FIG. 3, the method may also include determining transmission parameters of a data transmission based on the CSI feedback 18 and the one or more CSI-RS ports determined (Block 330). The method in this case may also include transmitting the data transmission with the determined transmission parameters (Block 340). In some embodiments, the data transmission may be transmitted on the one or more CSI-RS ports.

Also as shown in FIG. 3, the method may include beamforming the CSI-RS specifically for the wireless device 14 (Block 305). In some embodiments, the method alternatively or additionally includes determining a precoder for the CSI-RS from (i.e., based on) an uplink sounding reference signal received from the wireless device 14 and applying the precoder to the CSI-RS (Block 315). In some embodiments, the method may further include determining the number of CSI-RS ports from the uplink sounding reference signal.

In some embodiments, the method comprises, for each of the one or more supported transmission ranks, refraining from configuring the wireless device via control signaling with a parameter indicating one or more CSI-RS ports in the CSI-RS resource that are associated with the supported transmission rank.

In any of these embodiments, the CSI-RS feedback may be non-precoder matrix indicator (non-PMI) CSI feedback such that the CSI-RS feedback does not indicate a PMI.

In any of these embodiments, the CSI-RS resource may be dedicated to the wireless device. Alternatively or additionally, CSI-RS resource may be aperiodically triggered.

In some embodiments, for each of the one or more supported transmission ranks except the highest supported transmission rank, the one or more CSI-RS ports in the CSI-RS resource that are associated by default with the supported transmission rank is a proper subset of the one or more CSI-RS ports in the CSI-RS resource that are associated by default with a higher supported transmission rank. Alternatively or additionally, in some embodiments, for each rank v of the one or more supported transmission ranks, the one or more CSI-RS ports in the CSI-RS resource that are associated by default with the rank v have one or more respective CSI-RS port indices of 0, . . . , v−1.

Figure 4:
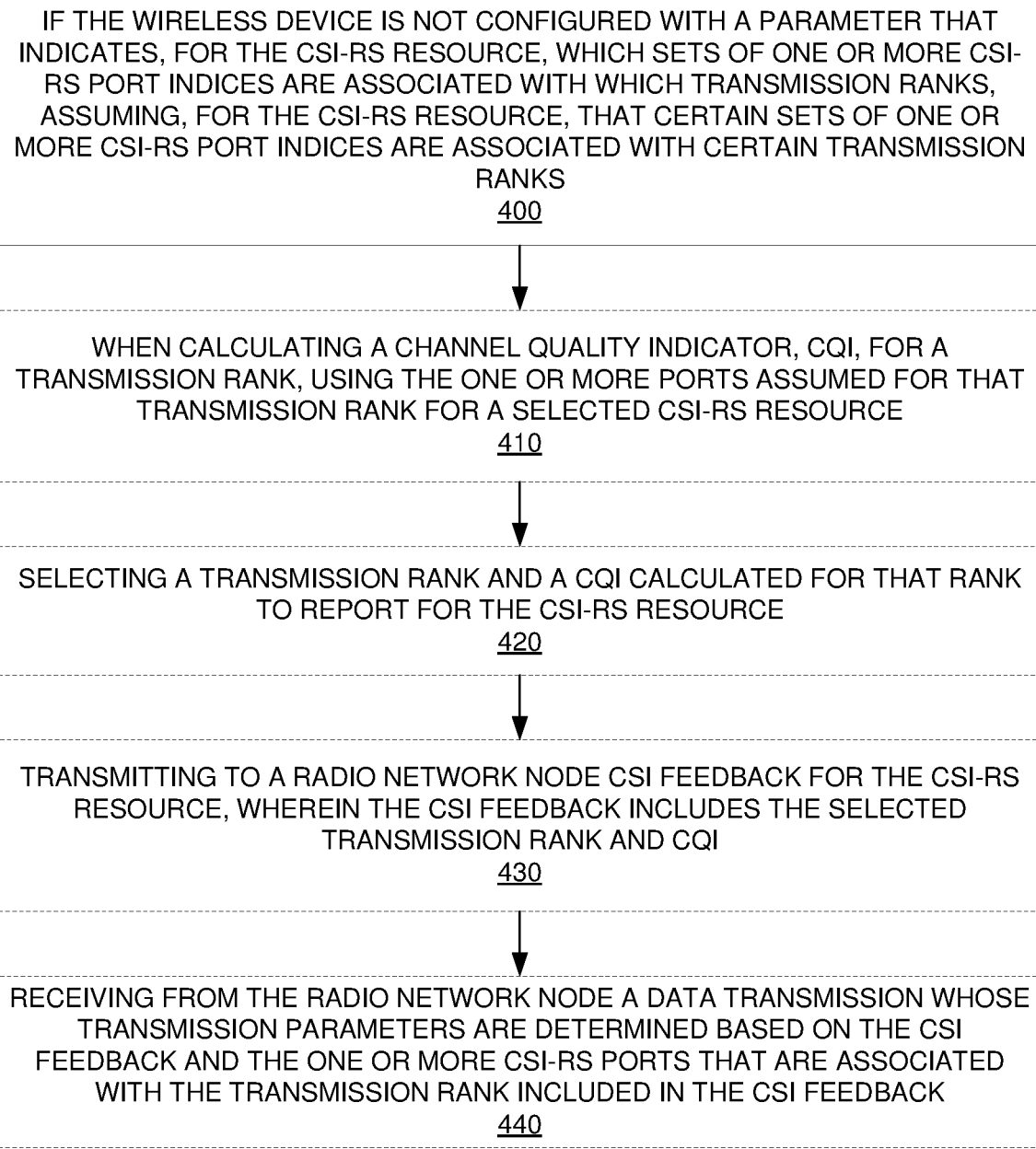
FIG. 4 is a logic flow diagram of a method performed by a wireless device according to other embodiments.

FIG. 4 depicts a method performed by a wireless device 14 for reporting channel state information (CSI) feedback 18 based on a CSI-RS 16 received on a CSI-RS resource of one or more CSI-RS ports, in accordance with other particular embodiments. The method includes, if the wireless device 14 is not configured with a parameter that indicates, for the CSI-RS resource, which sets of one or more CSI-RS port indices are associated with which transmission ranks, assuming, for the CSI-RS resource, that certain sets of one or more CSI-RS port indices are associated with certain transmission ranks (Block 400). Such assuming may mean for instance that the wireless device operates based on an assumed condition or association, namely that, for the CSI-RS resource, certain sets of one or more CSI-RS port indices are associated with certain transmission ranks. Regardless, assuming this may comprise for instance assuming, for each of one or more supported transmission ranks except the highest supported transmission rank, that a set of one or more CSI-RS ports associated with the supported transmission rank is a proper subset of the set of one or more CSI-RS ports associated with a higher supported transmission rank. Alternatively or additionally, assuming this may comprise assuming, for each rank v of one or more supported transmission ranks, that a set of one or more CSI-RS ports associated with the rank v have one or more respective CSI-RS port indices of 0, . . . , v−1.

Regardless, the method in some embodiments may also include, when calculating a channel quality indicator (CQI) for a transmission rank, using the one or more ports assumed for that transmission rank for a selected CSI-RS resource (Block 410).

In some embodiments, the method may further comprise selecting a transmission rank and a CQI calculated for that rank to report for the CSI-RS resource (Block 420). In some embodiments, the method then includes transmitting to a radio network node 12 CSI feedback 18 for the CSI-RS resource, wherein the CSI feedback 18 includes the selected transmission rank 18A and CQI 18B (Block 430).

Also as shown in FIG. 4, in some embodiments, the method may further include receiving from the radio network node 12 a data transmission whose transmission parameters are determined based on the CSI feedback 18 and the one or more CSI-RS ports that are associated (e.g., by default) with the transmission rank included in the CSI feedback 18 (Block 440).

In any of these embodiments, the CSI-RS feedback may be non-precoder matrix indicator (non-PMI) CSI feedback such that the CSI-RS feedback does not indicate a PMI.

In any of these embodiments, the CSI-RS resource may be dedicated to the wireless device. Alternatively or additionally, CSI-RS resource may be aperiodically triggered.

In some embodiments, the CSI-RS is beamformed specifically for the wireless device.

In any of these embodiments, the method may comprise, for each of one or more supported transmission ranks, applying an identity matrix precoder on the one or more CSI-RS ports in the CSI-RS resource that are associated by default with the supported transmission rank and calculating the CQI for the supported transmission rank using the determined one or more CSI-RS ports, with the identity matrix precoder applied.

Figure 5:
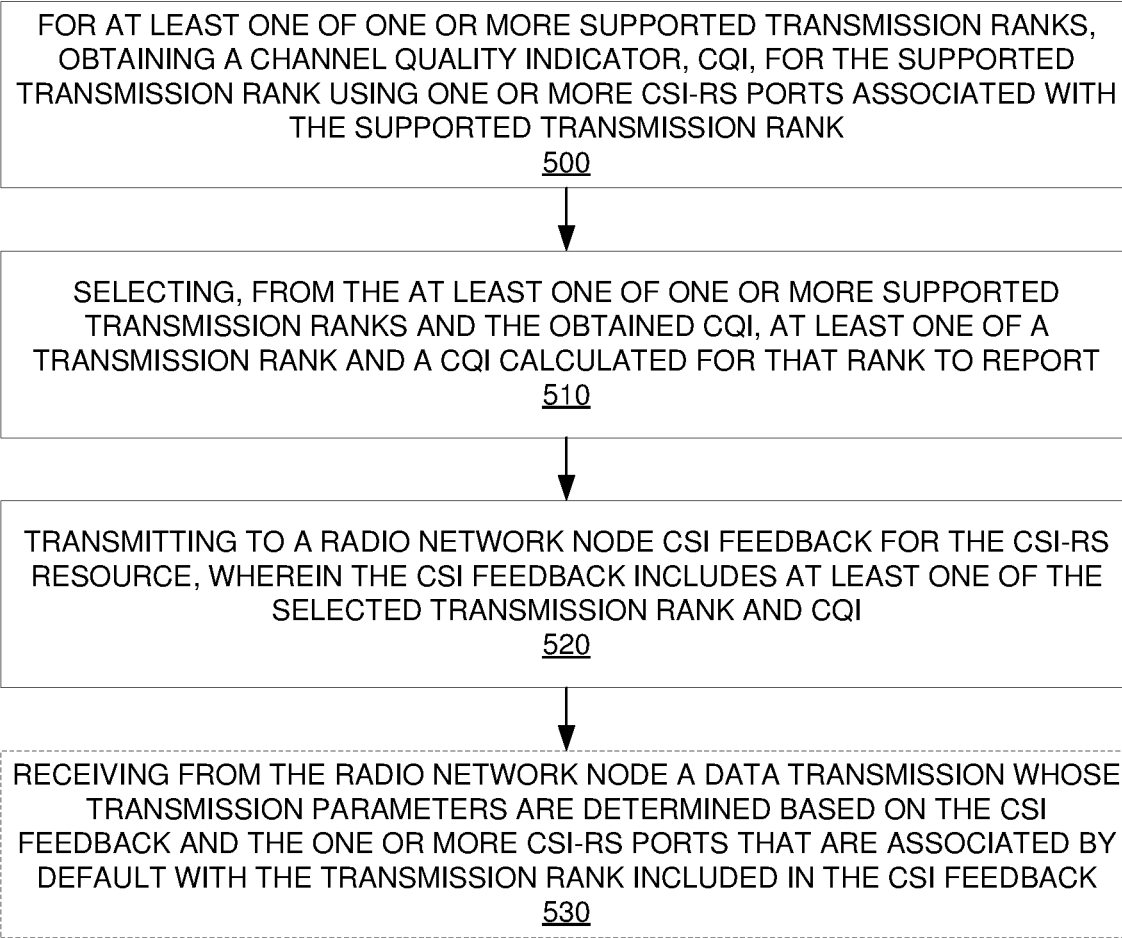
FIG. 5 is a logic flow diagram of a method performed by a wireless device according to still other embodiments.

FIG. 5 depicts a method performed by a wireless device 14 for reporting channel state information (CSI) feedback 18 based on a CSI-RS 16 received on a CSI-RS resource of one or more CSI-RS ports, in accordance with still other particular embodiments. The method includes, for at least one of one or more supported transmission ranks, obtaining a channel quality indicator, CQI, for the supported transmission rank using one or more CSI-RS ports associated with the supported transmission rank (Block 500). The method in some embodiments may also include selecting, from the at least one of one or more supported transmission ranks and the obtained CQI, at least one of a transmission rank and a CQI calculated for that rank to report (Block 510). In some embodiments, the method then includes transmitting to a radio network node 12 CSI feedback 18 for the CSI-RS resource, wherein the CSI feedback 18 includes at least one of the selected transmission rank 18A and CQI 18B (Block 220).

In some embodiments, the step or steps in the method are performed for each of one or more of the supported transmission ranks.

Note that, in some embodiments, the association of one or more CSI-RS ports associated with the supported transmission rank is by default. In some embodiments, for example, for at least one of the one or more supported transmission ranks, the association of one or more CSI-RS ports associated with the supported transmission rank is by default if the wireless device 14 is not configured by control signaling (e.g., radio resource control, RRC, signaling) with a parameter (e.g., non-PMI-PortIndication) indicating one or more CSI-RS ports in the CSI-RS resource to use for obtaining a CQI for the supported transmission rank.

In some embodiments, for each of the one or more supported transmission ranks except the highest supported transmission rank, the one or more CSI-RS ports in the CSI-RS resource that are associated by default with the supported transmission rank is a proper subset of the one or more CSI-RS ports in the CSI-RS resource that are associated by default with a higher supported transmission rank. Alternatively or additionally, in some embodiments, for each rank v of the one or more supported transmission ranks, the one or more CSI-RS ports in the CSI-RS resource that are associated by default with the rank v have one or more respective CSI-RS port indices of 0, . . . , v−1.

Also as shown in FIG. 5, in some embodiments, the method may further include receiving from the radio network node 12 a data transmission whose transmission parameters are determined based on the CSI feedback 18 and the one or more CSI-RS ports that are associated by default with the transmission rank included in the CSI feedback 18 (Block 530).

In any of these embodiments, the CSI-RS feedback may be non-precoder matrix indicator (non-PMI) CSI feedback such that the CSI-RS feedback does not indicate a PMI.

In any of these embodiments, the CSI-RS resource may be dedicated to the wireless device. Alternatively or additionally, CSI-RS resource may be aperiodically triggered.

In any of these embodiments, the method may comprise, for each of one or more supported transmission ranks, applying an identity matrix precoder on the one or more CSI-RS ports in the CSI-RS resource that are associated by default with the supported transmission rank and calculating the CQI for the supported transmission rank using the determined one or more CSI-RS ports, with the identity matrix precoder applied.

Figure 6:
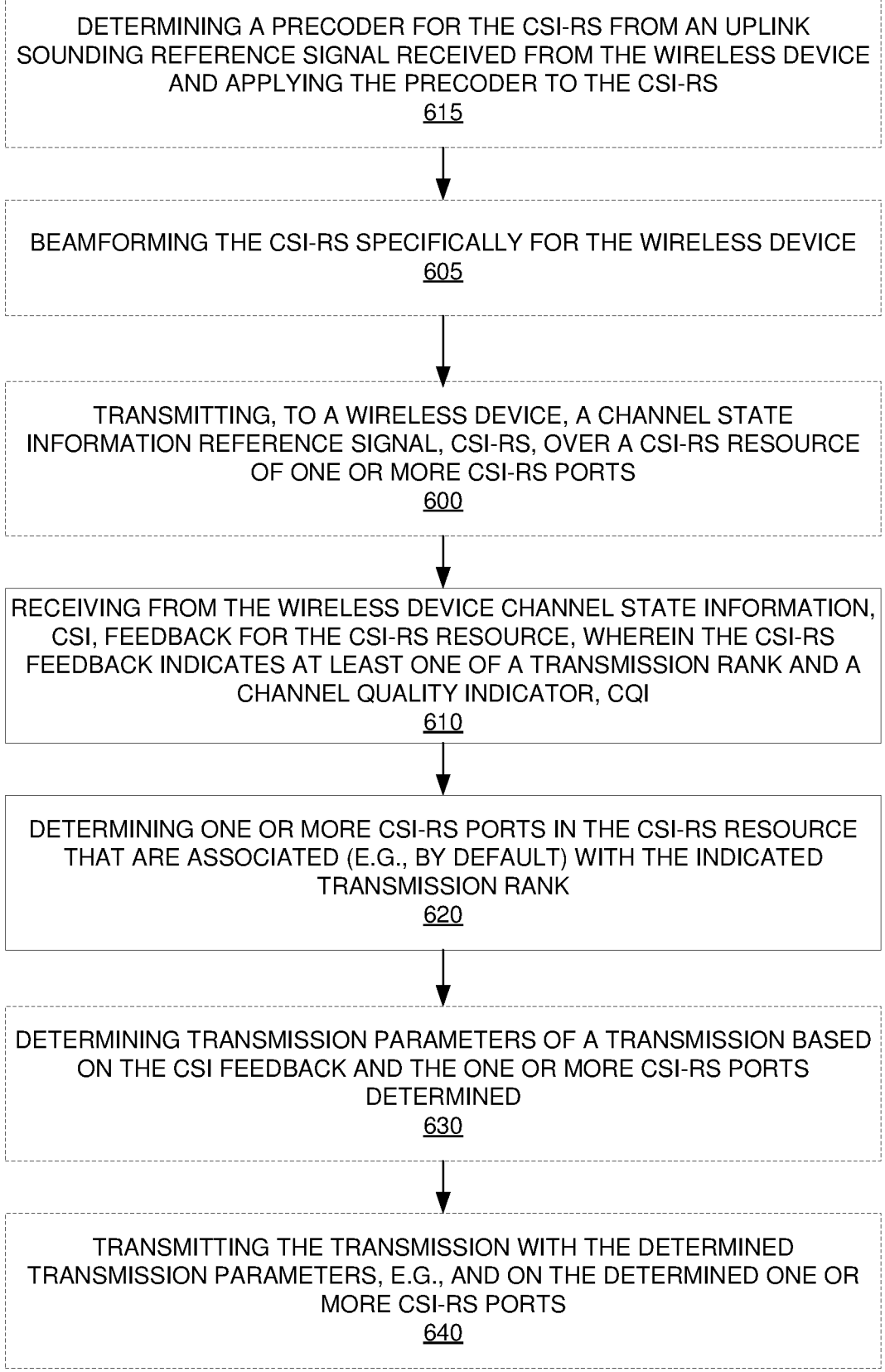
FIG. 6 is a logic flow diagram of a method performed by a radio network node according to other embodiments.

FIG. 6 depicts a method performed by a radio network node 12 in accordance with yet other particular embodiments. The method in some embodiments includes transmitting, to a wireless device 14, a channel state information reference signal (CSI-RS) 16 on a CSI-RS resource of one or more CSI-RS ports (Block 600). The method as shown also includes receiving from the wireless device 14 channel state information (CSI) feedback 18 for the CSI-RS resource, wherein the CSI feedback 18 indicates at least one of a transmission rank 18A and a channel quality indicator (CQI) 18B (Block 610). The method further includes determining one or more CSI-RS ports in the CSI-RS resource that are associated (e.g., by default) with the indicated transmission rank (Block 620). Where the association is by default, for example, this may mean for instance that the radio network node 12 determines one or more CSI-RS ports in the CSI-RS resource that are assumed to be associated with the transmission rank included in the CSI feedback 18.

In some embodiments as shown in FIG. 6, the method may also include determining transmission parameters of a transmission based on the CSI feedback 18 and the one or more CSI-RS ports determined (Block 630). The method in this case may also include transmitting the transmission with the determined transmission parameters (Block 640). In some embodiments, the transmission is transmitted on the one or more CSI-RS ports.

Also as shown in FIG. 6, the method may include beamforming the CSI-RS (e.g., of one or more CSI-RS ports) specifically for the wireless device 14 (Block 605). In some embodiments, the method alternatively or additionally includes determining a precoder for the CSI-RS from an uplink sounding reference signal received from the wireless device 14 and applying the precoder to the CSI-RS (Block 615). In some embodiments, the method also includes determining the number of CSI-RS ports from the uplink sounding reference signal. In some embodiments, the method comprises, for each of the one or more supported transmission ranks, refraining from configuring the wireless device 14 via control signaling with a parameter indicating one or more CSI-RS ports in the CSI-RS resource that are associated with the supported transmission rank.

In any of these embodiments, the CSI-RS feedback may be non-precoder matrix indicator (non-PMI) CSI feedback such that the CSI-RS feedback does not indicate a PMI.

In any of these embodiments, the CSI-RS resource may be dedicated to the wireless device 14. Alternatively or additionally, CSI-RS resource may be aperiodically triggered.

In some embodiments, for each of the one or more supported transmission ranks except the highest supported transmission rank, the one or more CSI-RS ports in the CSI-RS resource that are associated by default with the supported transmission rank is a proper subset of the one or more CSI-RS ports in the CSI-RS resource that are associated by default with a higher supported transmission rank. Alternatively or additionally, in some embodiments, for each rank v of the one or more supported transmission ranks, the one or more CSI-RS ports in the CSI-RS resource that are associated by default with the rank v have one or more respective CSI-RS port indices of 0, . . . , v−1.

Embodiments herein also include corresponding apparatuses. Embodiments herein for instance include a wireless device configured to perform any of the steps of any of the embodiments described above for the wireless device.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node configured to perform any of the steps of any of the embodiments described above for the radio network node.

Embodiments also include a radio network node comprising processing circuitry and power supply circuitry. The processing circuitry is configured to perform any of the steps of any of the embodiments described above for the radio network node. The power supply circuitry is configured to supply power to the radio network node.

Embodiments further include a radio network node comprising processing circuitry. The processing circuitry is configured to perform any of the steps of any of the embodiments described above for the radio network node. In some embodiments, the radio network node further comprises communication circuitry.

Embodiments further include a radio network node comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
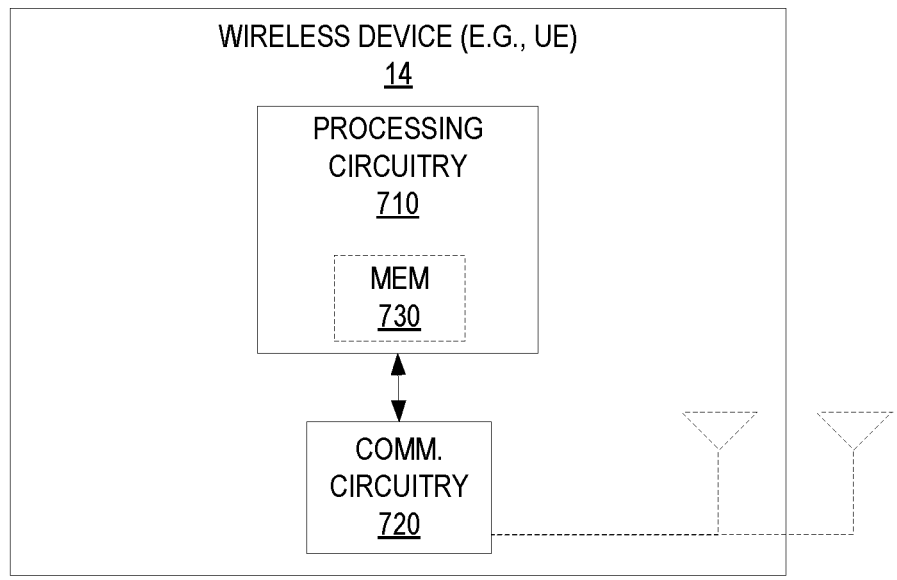
FIG. 7 is a block diagram of a wireless device according to some embodiments.

FIG. 7 for example illustrates a wireless device 700 (e.g., wireless device 14) as implemented in accordance with one or more embodiments. As shown, the wireless device 700 includes processing circuitry 710 and communication circuitry 720. The communication circuitry 720 (e.g., radio circuitry) is configured to transmit and/or receive information to and/or from one or more other nodes, e.g., via any communication technology. Such communication may occur via one or more antennas that are either internal or external to the wireless device 700. The processing circuitry 710 is configured to perform processing described above, such as by executing instructions stored in memory 730. The processing circuitry 710 in this regard may implement certain functional means, units, or modules.

Figure 8:
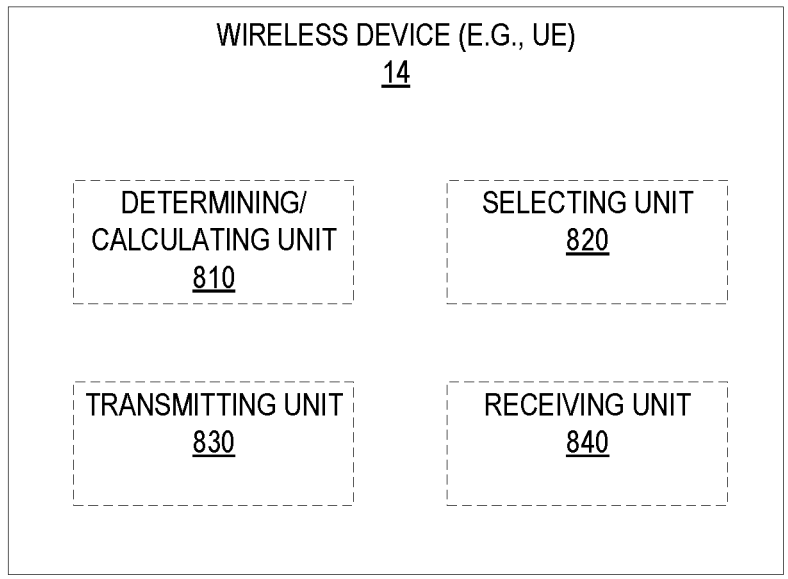
FIG. 8 is a block diagram of a wireless device according to other embodiments.
Figure 15:
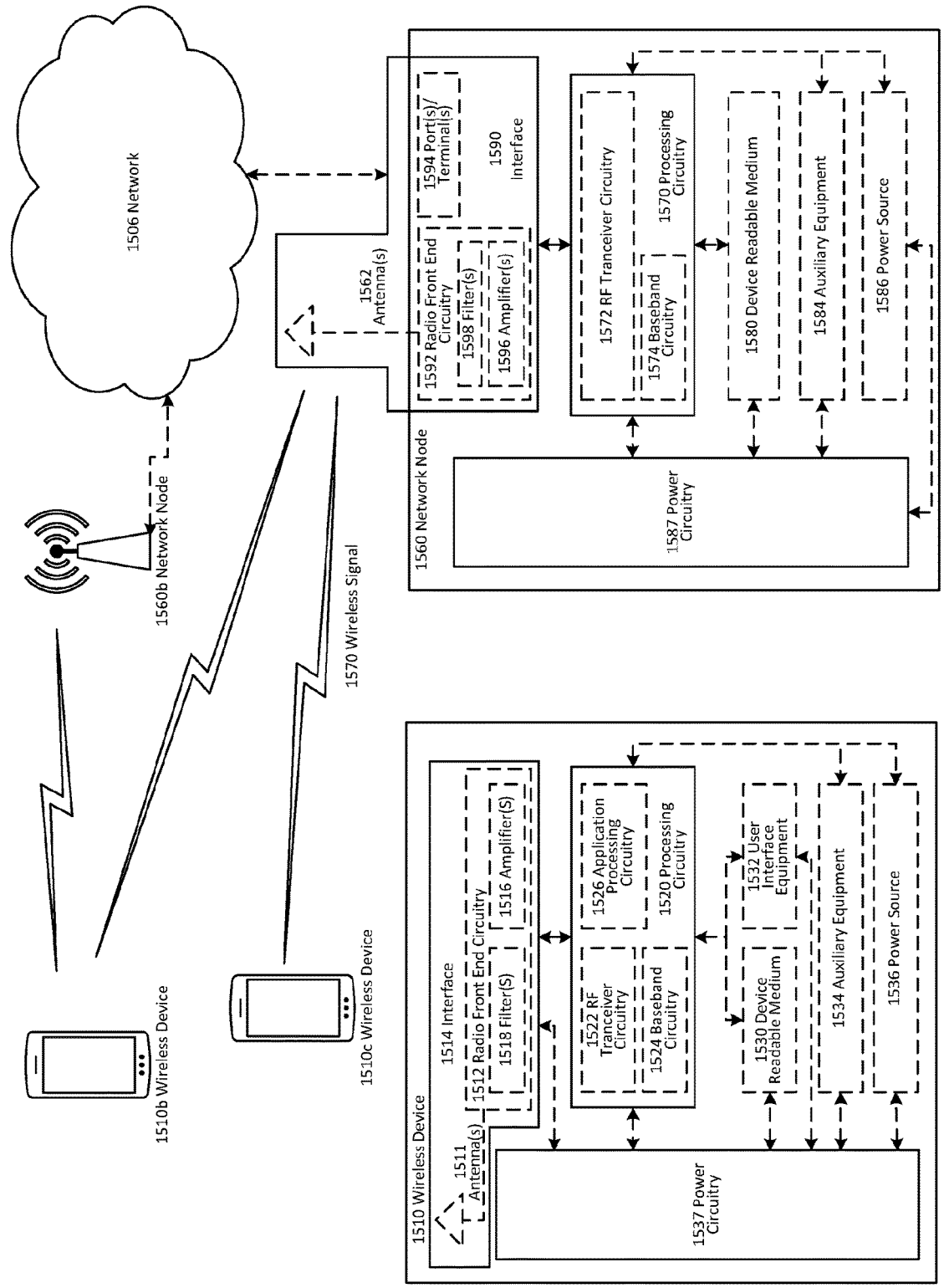
FIG. 15 is a block diagram of a wireless communication network according to some embodiments.

FIG. 8 illustrates a schematic block diagram of a wireless device 800 (e.g., wireless device 14) in a wireless network according to still other embodiments (for example, the wireless network shown in FIG. 15). As shown, the wireless device 800 implements various functional means, units, or modules, e.g., via the processing circuitry 710 in FIG. 7 and/or via software code. These functional means, units, or modules, e.g., for implementing the method(s) herein, include for instance a determining and/or calculating unit 810 for, for each of one or more supported transmission ranks, determining one or more CSI-RS ports in the CSI-RS resource that are associated by default with the supported transmission rank and calculating a CQI for the supported transmission rank using the determined one or more CSI-RS ports. Also included may be a selecting unit 820 for selecting, from the one or more supported transmission ranks and the CQI respectively calculated for the one or more supported transmission ranks, a transmission rank and a CQI calculated for that rank to report for the CSI-RS resource. Further included may be a transmitting unit 830 for transmitting to a radio network node CSI feedback for the CSI-RS resource, wherein the CSI feedback includes the selected transmission rank and CQI. In some embodiments, a receiving unit 840 may also be included for receiving from the radio network node a data transmission whose transmission parameters are determined based on the CSI feedback and the one or more CSI-RS ports that are associated by default with the transmission rank included in the CSI feedback.

Figure 9:
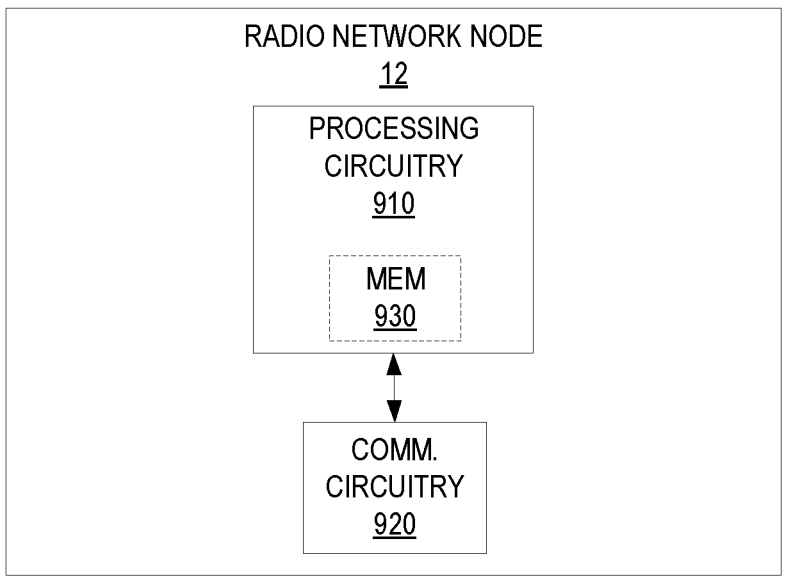
FIG. 9 is a block diagram of a radio network node according to some embodiments.

FIG. 9 illustrates a radio network node 900 (e.g., radio network node 12) as implemented in accordance with one or more embodiments. As shown, the radio network node 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, such as by executing instructions stored in memory 930. The processing circuitry 910 in this regard may implement certain functional means, units, or modules.

Figure 10:
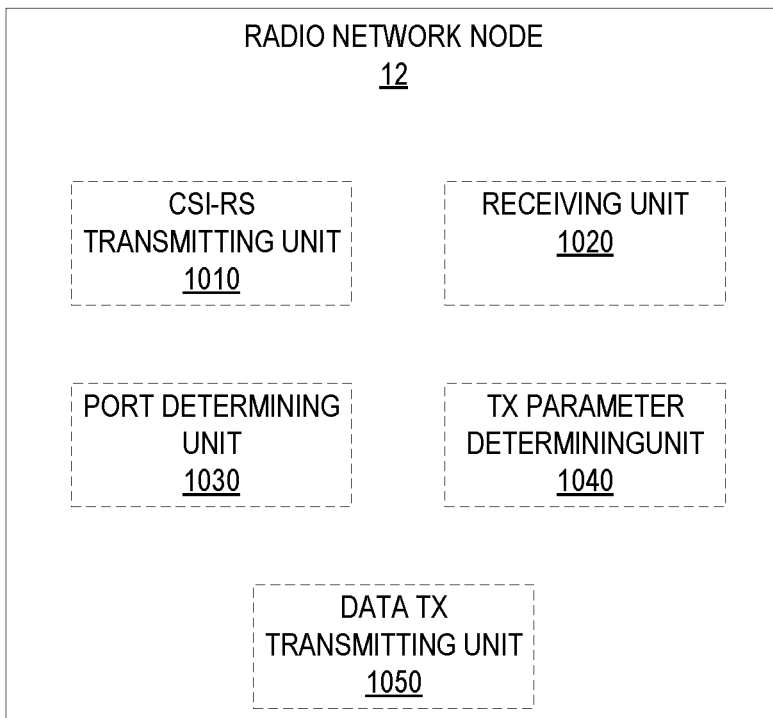
FIG. 10 is a block diagram of a radio network node according to other embodiments.

FIG. 10 illustrates a schematic block diagram of a radio network node 1000 (e.g., radio network node 12) in a wireless network according to still other embodiments (for example, the wireless network shown in FIG. 15). As shown, the radio network node 1000 implements various functional means, units, or modules, e.g., via the processing circuitry 910 in FIG. 9 and/or via software code. These functional means, units, or modules, e.g., for implementing the method(s) herein, include for instance a CSI-RS transmitting unit 1010 for transmitting, to a wireless device, a channel state information reference signal, CSI-RS, on a CSI-RS resource of one or more CSI-RS ports. Also included may be a receiving unit 1020 for receiving from the wireless device channel state information, CSI, feedback based on the CSI-RS signal received on the CSI-RS resource, wherein the CSI feedback includes a transmission rank and a channel quality indicator, CQI. Further included may be a port determining unit 1030 for determining one or more CSI-RS ports in the CSI-RS resource that are associated by default with the indicated transmission rank.

In some embodiments, a transmit parameter determining unit 1040 is also included for determining transmission parameters of a data transmission based on the CSI feedback and the one or more CSI-RS ports determined. In this case, also included may be a data transmission transmitting unit 1050 for transmitting the data transmission with the determined transmission parameters.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

According to the New Radio (NR) standard, a core component in NR is the support of MIMO antenna deployments and MIMO-related techniques. NR will support an 8-layer spatial multiplexing mode for up to 32 transmit (TX) antenna ports with channel-dependent precoding. The spatial multiplexing mode is aimed for high data rates in favorable channel conditions. An illustration of the spatial multiplexing operation is provided in FIG. 11.

Figure 11:
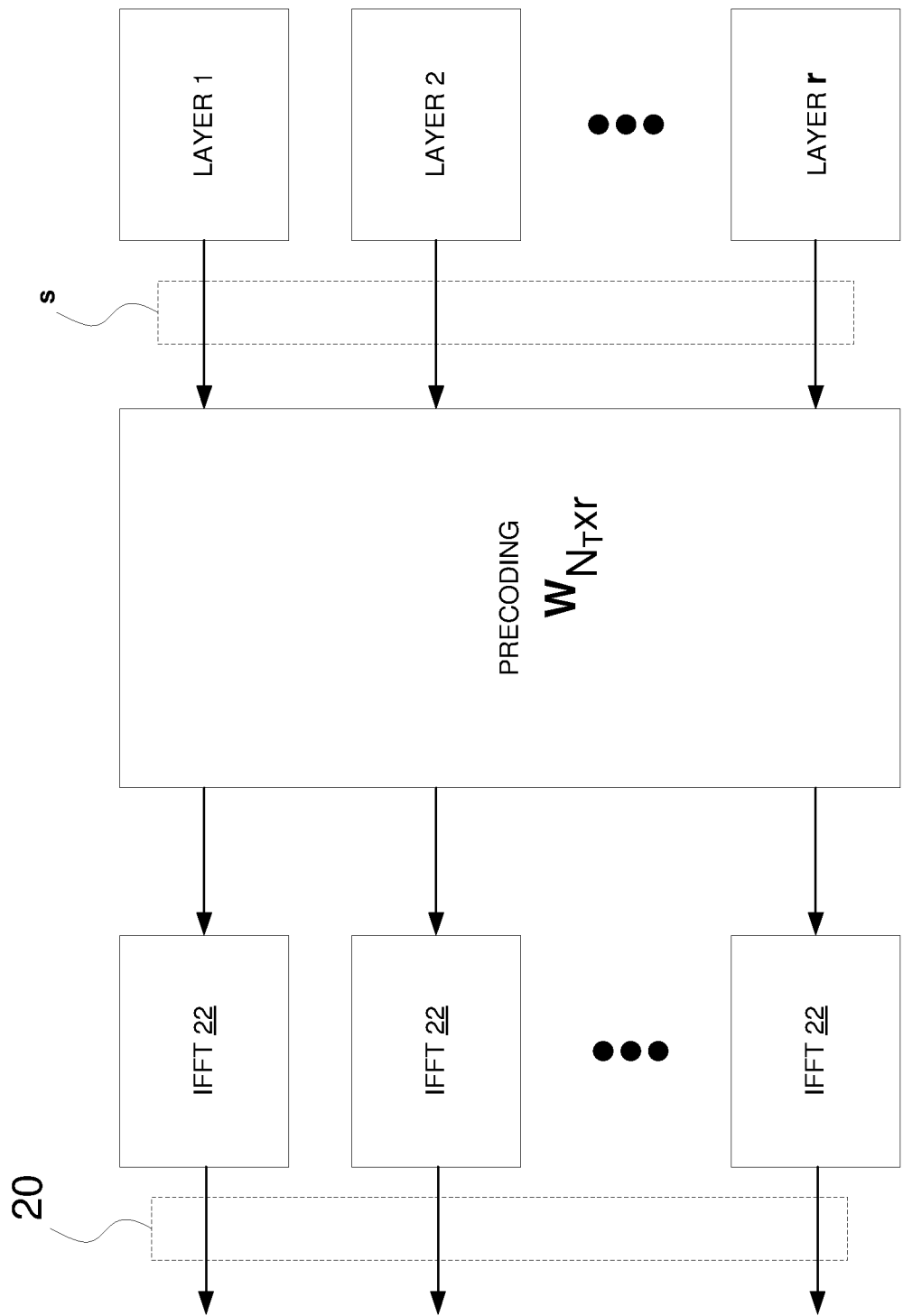
FIG. 11 is a block diagram of a precoding transmission structure according to some embodiments.

As shown in FIG. 11, an information carrying symbol vector s is formed from r symbols, where r is referred to as the transmission rank. The r symbols in the symbol vector s each correspond to a layer. This symbol vectors is multiplied by an $N_T \times r$ precoder matrix $W_{N_T \times r}$, where $N_T$ is a number of antenna ports 20 at the transmitter (e.g., after Inverse Fast Fourier Transform, IFFT, processing 22). This precoding serves to distribute the transmit energy in a subspace of an $N_T$ dimensional vector space. The precoder matrix may be selected from a codebook of possible precoder matrices, and may be indicated by means of a precoder matrix indicator (PMI) which specifies a unique precoder matrix in a codebook of possible precoder matrices for a given number of symbol streams. In this way, spatial multiplexing is achieved since multiple symbols can be transmitted simultaneously over the same time/frequency resource element (TFRE). The number of symbols r is typically adapted to suit the current channel properties.

NR uses Orthogonal Frequency Division Multiplexing (OFDM) in the downlink and hence the received $N_R \times 1$ vector $y_n$ for a certain TFRE on subcarrier n (or alternatively data TFRE number n) is thus modeled by $$y_n = H_n W s_n + e_n \qquad \text{Equation 1}$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the user equipment (UE). In addition, the precoder matrix may also be selected to strive for orthogonalizing the channel, meaning that, after proper linear equalization at the UE, the inter-layer interference is reduced.

One example method for a UE to select a precoder matrix W can be to select the $W_k$ that maximizes the Frobenius norm of the hypothesized equivalent channel:

$$\max_k \left\| \hat{H}_n W_k \right\|_F^2 \qquad \text{Equation 2}$$

where $\hat{H}_n$ is a channel estimate, $W_k$ is a hypothesized precoder matrix with index k, and $\hat{H}_n W_k$ is the hypothesized equivalent channel.

In closed-loop precoding for the $N_R$ downlink, the UE transmits, based on channel measurements in the forward link (downlink), recommendations to the gNodeB (gNB) of a suitable precoder to use. The gNB configures the UE to provide feedback, and may transmit a channel state information (CSI) reference signal (RS) (CSI-RS) and configure the UE to use measurements of CSI-RS to feed back recommended precoding matrices that the UE selects from a codebook. A single precoder that is supposed to cover a large bandwidth (wideband precoding) may be fed back. It may also be beneficial to match the frequency variations of the channel and instead feed back a frequency-selective precoding report, e.g. several precoders, one per subband. This is an example of the more general case of channel state information (CSI) feedback, which also encompasses feeding back other information than recommended precoders to assist the gNodeB in subsequent transmissions to the UE. Such other information may include channel quality indicators (CQIs) as well as transmission rank indicator (RI).

Given the CSI feedback from the UE, the gNB determines the transmission parameters it wishes to use to transmit to the UE, including the precoding matrix, transmission rank, and modulation and coding state (MCS). These transmission parameters may differ from the recommendations the UE makes. Therefore a rank indicator and MCS may be signaled in downlink control information (DCI), and the precoding matrix can be signaled in DCI or the gNB can transmit a demodulation reference signal from which the equivalent channel can be measured. The transmission rank, and thus the number of spatially multiplexed layers, is reflected in the number of columns of the precoder W. For efficient performance, it is important that a transmission rank that matches the channel properties is selected.

Figure 12:
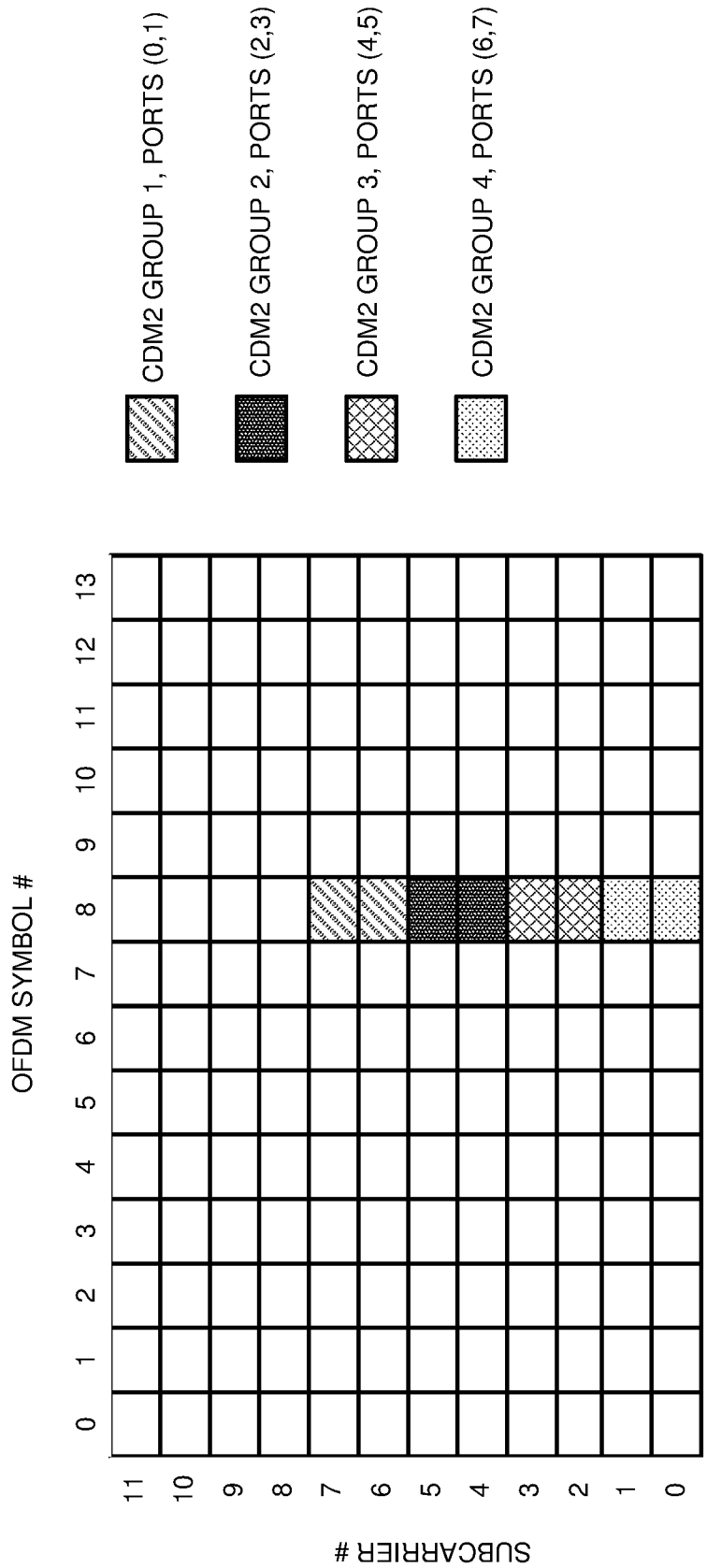
FIG. 12 is a block diagram of channel state information (CSI) reference signal (CSI-RS) transmission on CSI-RS ports according to some embodiments.

CSI reference signals (CSI-RS) are reference signals used for CSI estimations by a UE. The UE estimates the individual radio propagation channel between each transmit antenna port at a gNB and a receive antenna at the UE based on the received CSI-RS. Each antenna port carries a CSI-RS signal in certain resource elements (Res) and slots in $N_R$. An example of REs used for carrying CSI-RS signals for eight antenna ports is shown in FIG. 12, where one physical resource block (PRB) over one slot is shown. The CSI-RS are typically transmitted in the same REs in every PRB within a configured bandwidth. In this example, the CSI-RS resource for the eight ports consists of four RE pairs in one OFDM symbol. Two antenna ports are code division multiplexed (CDM) multiplexed on a pair of adjacent REs using length two orthogonal cover codes (OCC), or CDM2.

Figure 13:
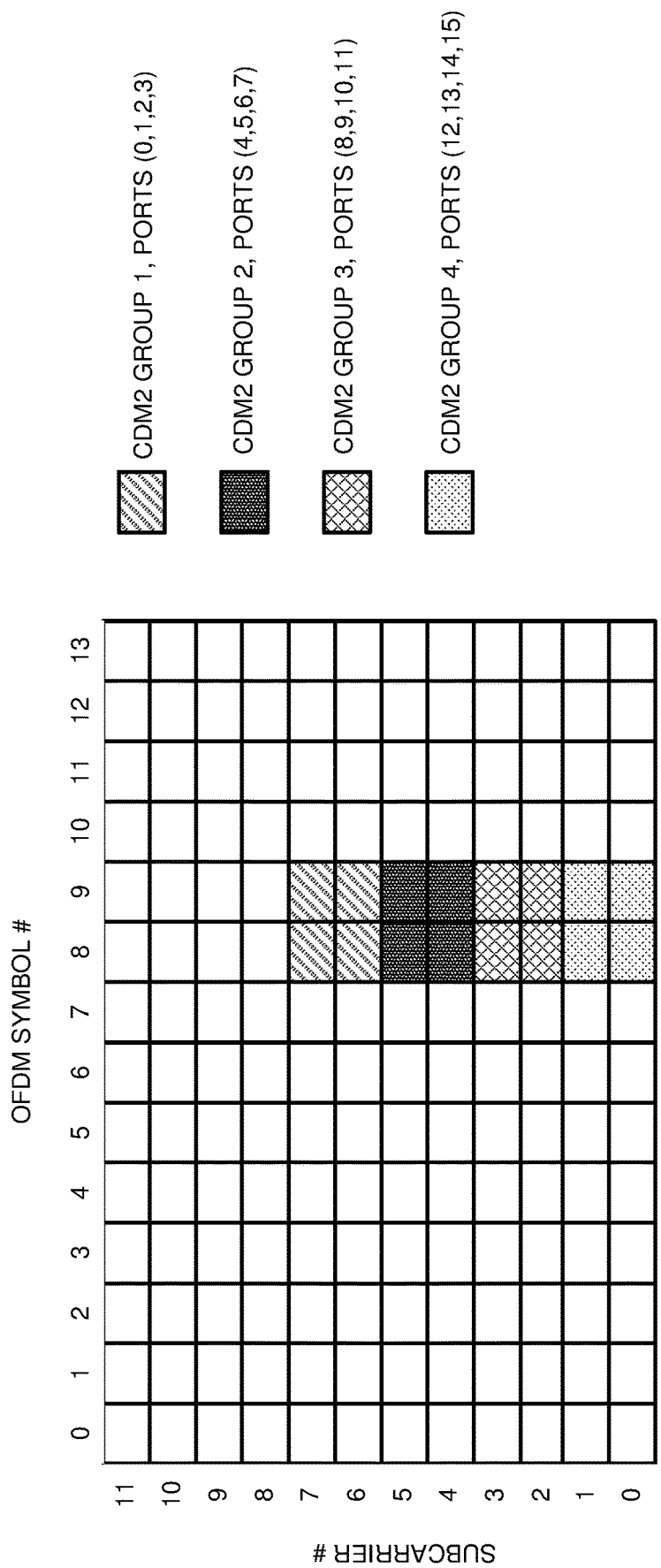
FIG. 13 is a block diagram of channel state information (CSI) reference signal (CSI-RS) transmission on CSI-RS ports according to other embodiments.

Another example of CSI-RS resource for 16 ports is shown in FIG. 13, where 16 REs in two OFDM symbols are allocated. The REs are further divided in four groups, each with 4 adjacent REs. Four antenna ports are code division multiplexed (CDM) multiplexed on a group of 4 adjacent REs using two by two orthogonal cover codes (OCC), or CDM4.

In $N_R$, a UE can be configured with N'>1 CSI reporting settings, M'>1 Resource settings, and 1 CSI measurement setting, where the CSI measurement setting includes L'>1 links. Each of the L' links corresponds to a CSI reporting setting and a resource setting. At least the following configuration parameters are signaled via RRC at least for CSI acquisition:

N', M', and L'—indicated either implicitly or explicitly;
In each CSI reporting setting, at least: reported CSI parameter(s), CSI Type (I or II) if reported, codebook configuration including codebook subset restriction, time-domain behavior (i.e. periodic, semi-persistent, or aperiodic), frequency granularity for CQI and PMI, measurement restriction configurations;
in each resource setting:
a configuration of S'>1 CSI-RS resource set(s) (note: each set corresponds to different selections from a 'pool' of all configured CSI-RS resources to the UE);
a configuration of K's>1 CSI-RS resources for each set s, including at least: mapping to REs, the number of ports, time-domain behavior, etc.;
In each of the L' links in CSI measurement setting: CSI reporting setting indication, Resource setting indication, quantity to be measured (either channel or interference), where one CSI reporting setting can be linked with one or multiple Resource settings and multiple CSI reporting settings can be linked with the same Resource setting At least the following are dynamically selected by Layer 1 or Layer 2 signaling, if applicable: (i) One or multiple CSI reporting settings within the CSI measurement setting; (ii) One or multiple CSI-RS resource sets selected from at least one Resource setting; (iii) One or multiple CSI-RS resources selected from at least one CSI-RS resource set.

Figure 14:
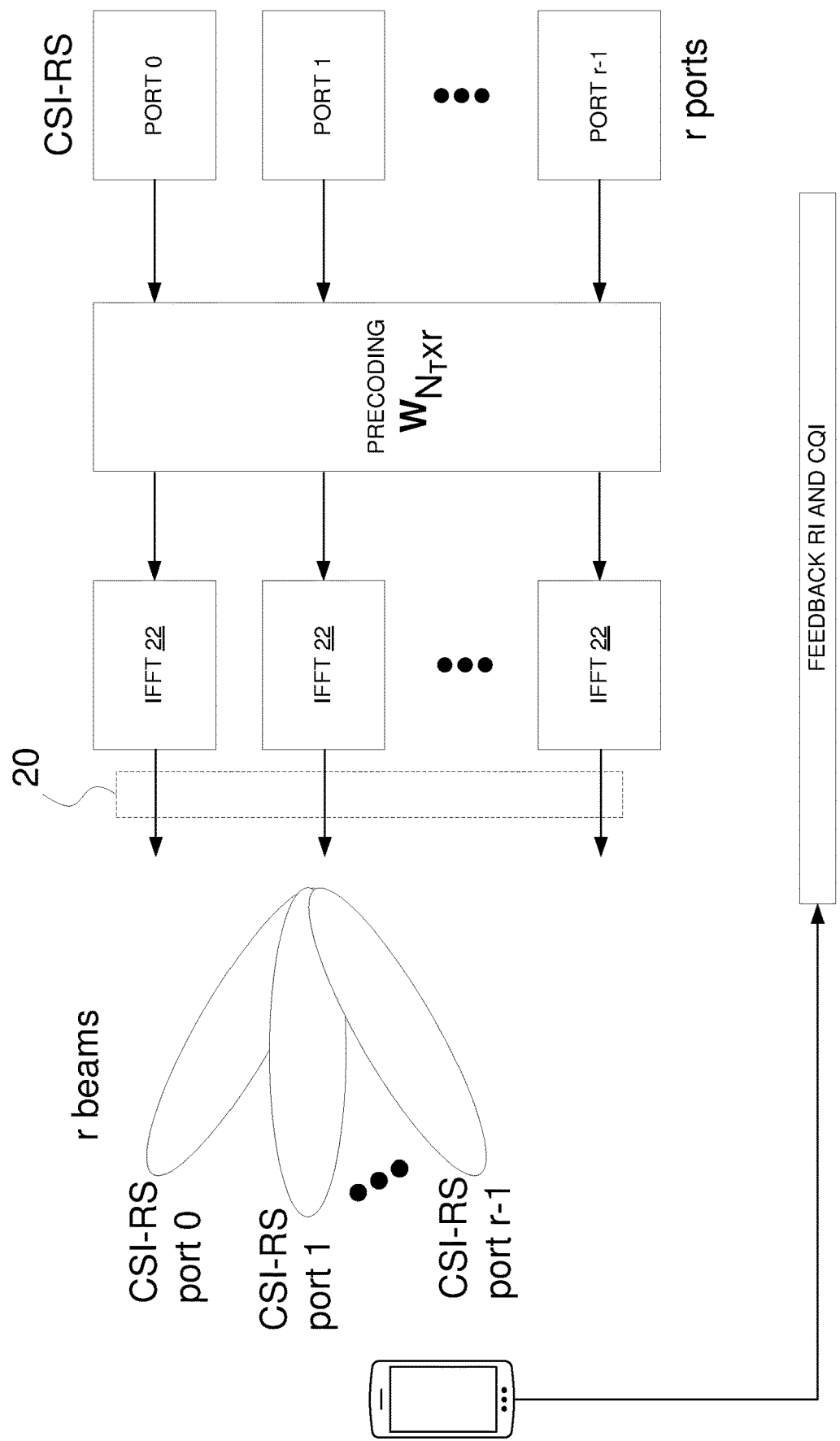
FIG. 14 is a block diagram of a precoding transmission structure for CSI-RS according to some embodiments.

To improve link adaptation in reciprocity-based operation, a non-PMI feedback scheme has been adopted in which the gNB transmits precoded CSI-RS to a UE. An example is shown in FIG. 14, where each precoded CSI-RS port corresponds to a MIMO layer and the precoding matrix $W_{N_T \times r}$ is derived from the uplink, where r is the number of MIMO layers estimated based on the uplink channel. The UE estimates the actual rank and CQI based on the received CSI-RS and the actual interference seen by the UE, and feeds back the estimated rank and CQI. For rank and CQI calculation, the UE assumes a single precoder for each rank. The precoder for rank k is a matrix formed by the first k columns of an P×P identity matrix, where P is the number of precoded CSI-RS ports and P=r in the example.

As described above, $N_R$ introduces a new CSI feedback mode called "non-PMI feedback" intended to be used with reciprocity-based operation in time division duplexing (TDD). In this CSI feedback mode, the UE only feeds back CQI and RI and assumes that the precoder used for CQI calculation is simply an identity matrix applied to a subset of ports of the CSI-RS resource. The intention is that the gNB would derive its desired precoder based on uplink (UL) sounding and is merely interested in getting UE feedback of the proper rank and link adaptation. Therefore, the gNB would UE-specifically beamform a CSI-RS (using a small number of ports, roughly the number of UE antennas) with a precoder determined from the UL sounding and the UE would just feed back rank and CQI. Since the CSI-RS resource itself is already beamformed with the gNB's intended precoder, the UE just needs to apply an identity matrix precoder on top of the CSI-RS ports and not a precoder from a codebook.

where r ports are indicated in the order of layer ordering for rank r and each CSI-RS resource in the CSI resource setting is linked to the CSI-ReportConfig based on the order of the associated NZP-CSI-RS-ResourceId in the linked CSI resource setting for channel measurement given by higher layer parameter resourcesForChannelMeasurement. The higher layer parameter non-PMI-PortIndication contains a sequence $p_0^{(1)}$, $p_0^{(2)}$, $p_1^{(2)}$, $p_0^{(3)}$, $p_1^{(3)}$, $p_2^{(3)}$, ..., $p_0^{(R)}$, $p_1^{(R)}$, ..., $p_{R-1}^{(R)}$, of port indices, where $p_0^{(v)}$, ..., $p_{v-1}^{(v)}$, are the CSI-RS port indices associated with rank v and R∈{1, 2, ..., min(8,P)} where P∈{1, 2, 4, 8} is the number of ports in the CSI-RS resource.

When calculating the CQI for a rank, the UE shall use the ports indicated for that rank for the selected CSI-RS resource. The precoder for the indicated ports shall be assumed to be the identity matrix."

That is, the UE is configured with what set of antenna ports it should measure on (and apply an identity matrix precoder) for each rank hypothesis and for each possible CSI-RS resource it can be triggered with.

The referenced higher layer parameter non-PMI-PortIndication is defined as follows in 38.331:

```
non-PMI-PortIndication          SEQUENCE (SIZE (1..maxNrofNZP-CSI-RS-
ResourcesPerConfig)) OF PortIndexFor8Ranks    OPTIONAL,    -- Need R
PortIndexFor8Ranks ::=          CHOICE {
    portIndex8                      SEQUENCE{
        rank1-8                         PortIndex8 OPTIONAL,   -- Need R
        rank2-8                         SEQUENCE(SIZE(2)) OF PortIndex8
                                        OPTIONAL,    -- Need R
        rank3-8                         SEQUENCE(SIZE(3)) OF PortIndex8
                                        OPTIONAL,    -- Need R
        rank4-8                         SEQUENCE(SIZE(4)) OF PortIndex8
                                        OPTIONAL,    -- Need R
        rank5-8                         SEQUENCE(SIZE(5)) OF PortIndex8
                                        OPTIONAL,    -- Need R
        rank6-8                         SEQUENCE(SIZE(6)) OF PortIndex8
                                        OPTIONAL,    -- Need R
        rank7-8                         SEQUENCE(SIZE(7)) OF PortIndex8
                                        OPTIONAL,    -- Need R
        rank8-8                         SEQUENCE(SIZE(8)) OF PortIndex8
                                        OPTIONAL -- Need R
    },
    portIndex4                      SEQUENCE{
        rank1-4                         PortIndex4 OPTIONAL,      -- Need R
        rank2-4                         SEQUENCE(SIZE(2)) OF PortIndex4
                                        OPTIONAL,    -- Need R
        rank3-4                         SEQUENCE(SIZE(3)) OF PortIndex4
                                        OPTIONAL,       -- Need R
        rank4-4                         SEQUENCE(SIZE(4)) OF PortIndex4
                                        OPTIONAL -- Need R
    },
    portIndex2                      SEQUENCE{
        rank1-2                         PortIndex2      OPTIONAL,      -- Need R
        rank2-2                         SEQUENCE(SIZE(2)) OF PortIndex2
                                        OPTIONAL -- Need R
    },
    portIndex1                      NULL
}
PortIndex8::=                   INTEGER (0..7)
PortIndex4::=                   INTEGER (0..3)
PortIndex2::=                   INTEGER (0..1)
```

More specifically, in $N_R$, non-PMI feedback is defined as follow in TS 38.214:

"If the UE is configured with a CSI-ReportConfig with the higher layer parameter reportQuantity set to 'cri-RI-CQI': the UE is configured with higher layer parameter non-PMI-PortIndication contained in a CSI-ReportConfig, There currently exist certain challenge(s). The radio resource control (RRC) signaling for configuring non-PMI feedback can be extremely heavy, e.g., several hundreds of kiloBytes! This can constitute the majority of the RRC signaling payload for configuring a cell. Part of this is due to the fact that the port signalling is given for each CSI-RS resource in the ResourceConfig, where maxNrofNZP-CSI-RS-ResourcesPerConfig is 128.

Certain aspects of the present disclosure and their embodiments may provide solutions to these or other challenges. To reduce excessive RRC signaling payload, some embodiments herein define a default port index indication that is applicable when the RRC information element non-PMI-PortIndication is not configured. An assumption of typical port index configuration, for the case when a CSI-RS resource is not shared between UEs and rank-nested precoding is used, is utilized to define the default port index indication.

Certain embodiments may provide one or more of the following technical advantage(s). The heavy RRC information signaling of port index indications for each CSI-RS resource does not need to be configured for the typical configuration case of non-shared CSI-RS resources and rank-nested precoding, thereby substantially reducing the RRC signalling overhead.

In the current RAN1 specification, the RRC information element non-PMI-PortIndication needs to be configured if non-PMI feedback is used as the CSI feedback mode. The signaling of the port indication is very flexible. For each possible CSI-RS resource that can be aperiodically triggered, an indication of what CSI-RS ports the UE shall measure on for each possible rank hypothesis for CQI calculation purpose is signaled. This flexibility enables two modes of operation. In one mode, a CSI-RS resource is shared between UEs. For instance, UE1 and UE2 can both share CSI-RS resource #1, but UE1 may use the first half of the ports (e.g. ports 0-3) while UE2 uses the second half of the ports (e.g. ports 4-7). This division of the ports within the resource is signaled with the RRC information element non-PMI-PortIndication. Another mode of operation includes non-rank-nested precoding, i.e. that a precoder for rank-1 hypothesis is not the first column of the precoder for rank-2 hypothesis. In this mode of operation, the different rank hypotheses use different subsets of CSI-RS ports.

However, in most cases, these two modes of operations are not used. Typically, each UE is assigned a dedicated CSI-RS resource and does not need to share a resource with another UE. And for most precoding strategies (such as eigenbeamforming or singular value decomposition (SVD) based precoding), the rank-nested property of the precoder holds, implying that the first column of each precoder vector for the different ranks are the same and so different rank hypotheses can share the same CSI-RS port for a certain layer (i.e. layer 1 uses CSI-RS port 0 for all ranks (rank-1, rank-2, ... ).

In this typical scenario, there is no need to have flexibility in assigning different ports to different rank hypotheses, but a fixed port mapping can equally well be used. Hence, a default mapping according to some embodiments is fixed (e.g., in the RAN1 specification) so that the heavy RRC information element does not need to be configured. This default mapping can be used for all possible CSI-RS resources that can be aperiodically triggered. Only if the gNB intends to apply some more sophisticated mode of operation, such as non-rank-nested precoding, the RRC parameter non-PMI-PortIndication can be configured. This saves average RRC overhead in the network.

In one embodiment, for example, the default port index indication is as follows. For rank-1 hypothesis, port 0 is used. For rank-2 hypothesis, ports 0-1 are used. For rank-3 hypothesis ports 0-2 are used. And so forth. To put in other words, for rank v, the first v antenna ports of the CSI-RS resource is/are used.

Some embodiments herein may be reflected in terms of 3GPP specification language as follows, with respect to 3GPP TS 38.214 Section 5.2.1.4.2:

"If the UE is configured with a CSI-ReportConfig with the higher layer parameter reportQuantity set to 'cri-RI-CQI':

If the UE is configured with higher layer parameter non-PMI-PortIndication contained in a CSI-ReportConfig, r ports are indicated in the order of layer ordering for rank r and each CSI-RS resource in the CSI resource setting is linked to the CSI-ReportConfig based on the order of the associated NZP-CSI-RS-ResourceId in the linked CSI resource setting for channel measurement given by higher layer parameter resourcesForChannelMeasurement. The configured higher layer parameter non-PMI-PortIndication contains a sequence $p_0^{(1)}$, $p_0^{(2)}$, $p_1^{(2)}$, $p_0^{(3)}$, $p_1^{(3)}$, $p_2^{(3)}$, ..., $p_0^{(R)}$, $p_1^{(R)}$, ..., $p_{R-1}^{(R)}$ of port indices, where $p_0^{(v)}, \ldots, p_{v-1}^{(v)}$ are the CSI-RS port indices associated with rank v and $R \in \{1, 2, \ldots, \min(8,P)\}$ where $P \in \{1, 2, 4, 8\}$ is the number of ports in the CSI-RS resource.

If the UE is not configured with higher layer parameter non-PMI-PortIndication, the UE assumes, for each CSI-RS resource in the CSI resource setting linked to the CSI-ReportConfig, that the CSI-RS port indices $p_0^{(v)}, \ldots, p_{v-1}^{(v)} = \{0, \ldots, v-1\}$ are associated with ranks v=1, 2, ..., min(8,P) where $P \in \{1, 2, 4, 8\}$ is the number of ports in the CSI-RS resource."

Note that some embodiments herein for default association between CSI-RS ports and transmission ranks may be selectively implemented under some circumstances (e.g., non-shared CSI-RS resources and rank-nested precoding) whereas other embodiments may be selectively implemented in other circumstances (e.g., shared CSI-RS resources or non-rank-nested precoding). Such other embodiments may for example signal the association between CSI-RS ports and transmission ranks. In such other embodiment, then, the UE is signaled with one or more CSI-RS resources or resource sets and a portion indication is also signaled to the UE for each CSI-RS resource or resource set. Alternatively, the port index indication is included in a CSI report setting configuration and signaled to the UE. The port index indication provides information on which ports in the CSI-RS resource should be used for rank and CQI calculation for non-PMI CSI feedback. The signaling may be RRC signaling.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560*b*, and WDs 1510, 1510*b*, and 1510*c*. In practice, a wireless network may further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple RAM modules).

Similarly, network node 1560 may be composed of multiple physically separate components (e.g., a NodeB component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1560 may be configured to support multiple radio access technologies (RATs). In such embodiments, some components may be duplicated (e.g., separate device readable medium 1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, WCDMA, LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features, functions, or benefits discussed herein. In some embodiments, processing circuitry 1570 may include a system on a chip (SOC).

In some embodiments, processing circuitry 1570 may include one or more of radio frequency (RF) transceiver circuitry 1572 and baseband processing circuitry 1574. In some embodiments, radio frequency (RF) transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units In certain embodiments, some or all of the functionality described herein as being provided by a network node, base station, eNB or other such network device may be performed by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1590 and may be any type of antenna capable of transmitting and receiving data and/or signals wirelessly. In some embodiments, antenna 1562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node 1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520, and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface 1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1518 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510, and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a USB port, a headphone interface, or other output circuitry. Using one or more input and output interfaces, devices, and circuits, of user interface equipment 1532, WD 1510 may communicate with end users and/or the wireless network, and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc. The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
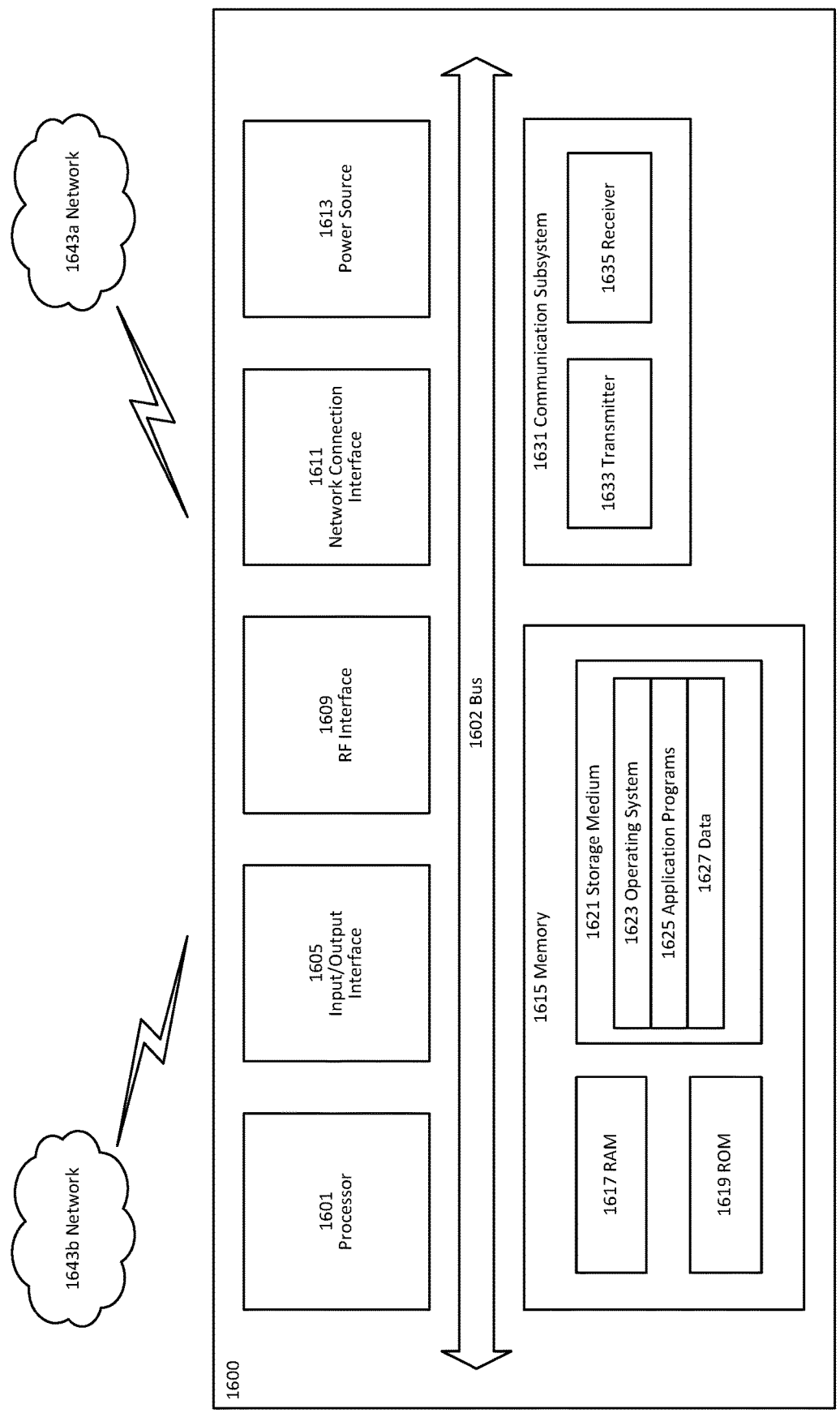
FIG. 16 is a block diagram of a user equipment according to some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 16200 may be any UE identified by the 3rd Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1605. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643a. Network 1643a may encompass wired and/or wireless networks such as a local-area network (LAN), a wide-area network (WAN), a computer network, a wireless network, a telecommunications network, another like network or any combination thereof. For example, network 1643a may comprise a Wi-Fi network. Network connection interface 1611 may be configured to include a receiver and a transmitter interface used to communicate with one or more other devices over a communication network according to one or more communication protocols, such as Ethernet, TCP/IP, SONET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE

1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643b using communication subsystem 1631. Network 1643a and network 1643b may be the same network or networks or different network or networks. Communication subsystem 1631 may be configured to include one or more transceivers used to communicate with network 1643b. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643b may encompass wired and/or wireless networks such as a local-area network (LAN), a wide-area network (WAN), a computer network, a wireless network, a telecommunications network, another like network or any combination thereof. For example, network 1643b may be a cellular network, a Wi-Fi network, and/or a near-field network. Power source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 17:
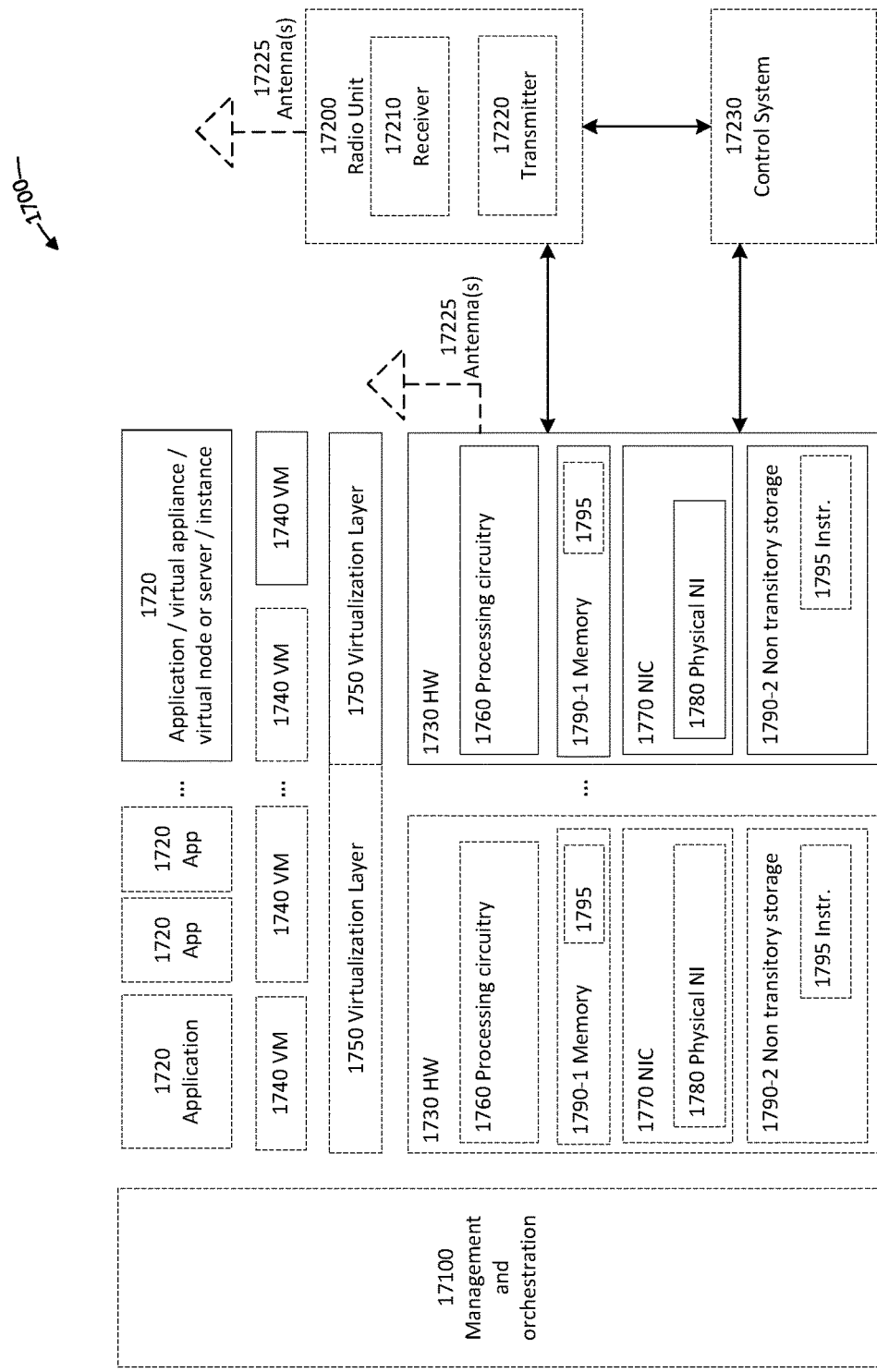
FIG. 17 is a block diagram of a virtualization environment according to some embodiments.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

In some embodiments, some signalling can be effected with the use of control system 17230 which may alternatively be used for communication between the hardware nodes 1730 and radio units 17200.

Figure 18:
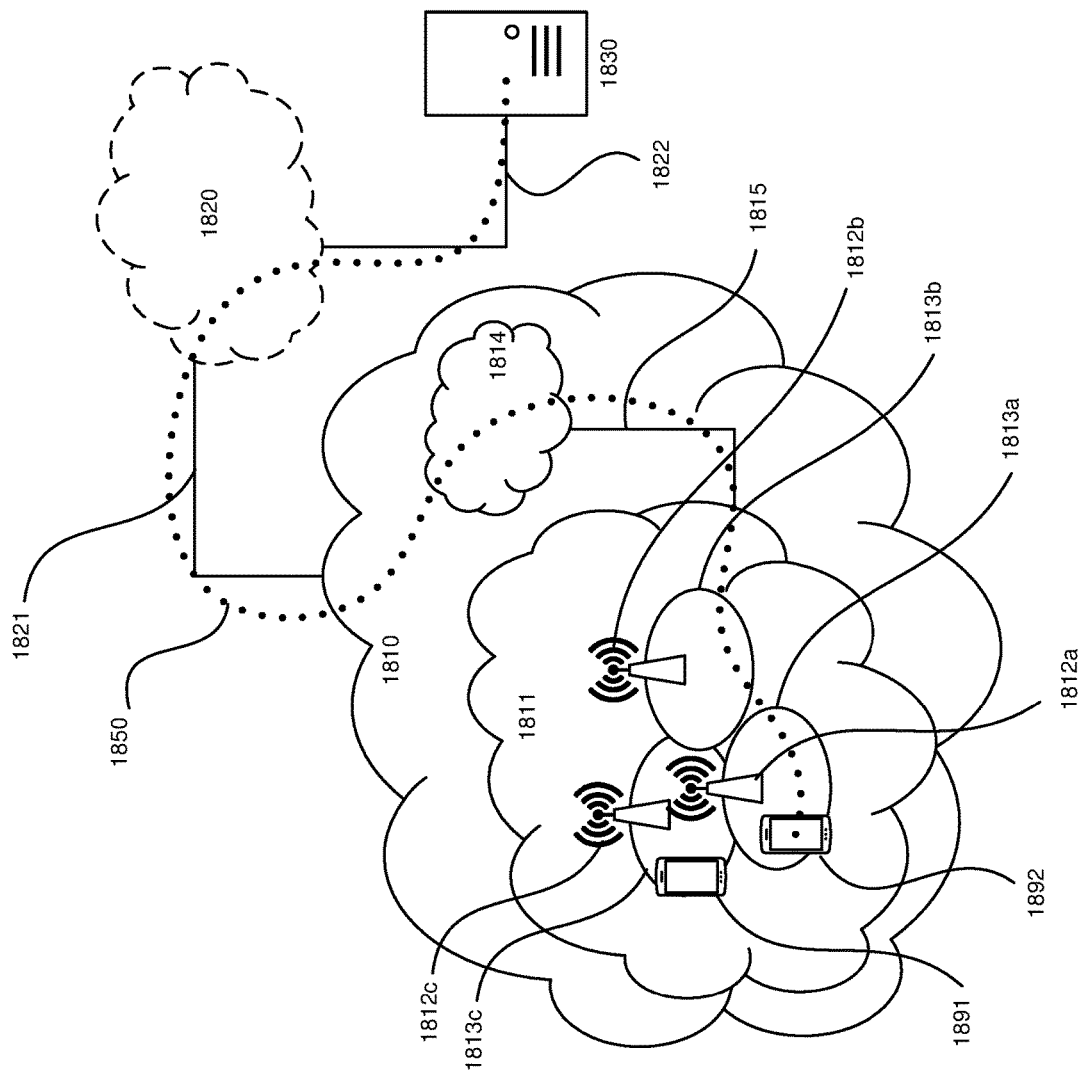
FIG. 18 is a block diagram of a communication network with a host computer according to some embodiments.

FIG. 18 illustrates a telecommunication network connected via an intermediate network to a host computer in accordance with some embodiments. In particular, with reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812a, 1812b, 1812c, such as NBs, eNBs, gNBs or other types of wireless access points, each defining a corresponding coverage area 1813a, 1813b, 1813c. Each base station 1812a, 1812b, 1812c is connectable to core network 1814 over a wired or wireless connection 1815. A first UE 1891 located in coverage area 1813c is configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider, or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 18 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Figure 19:
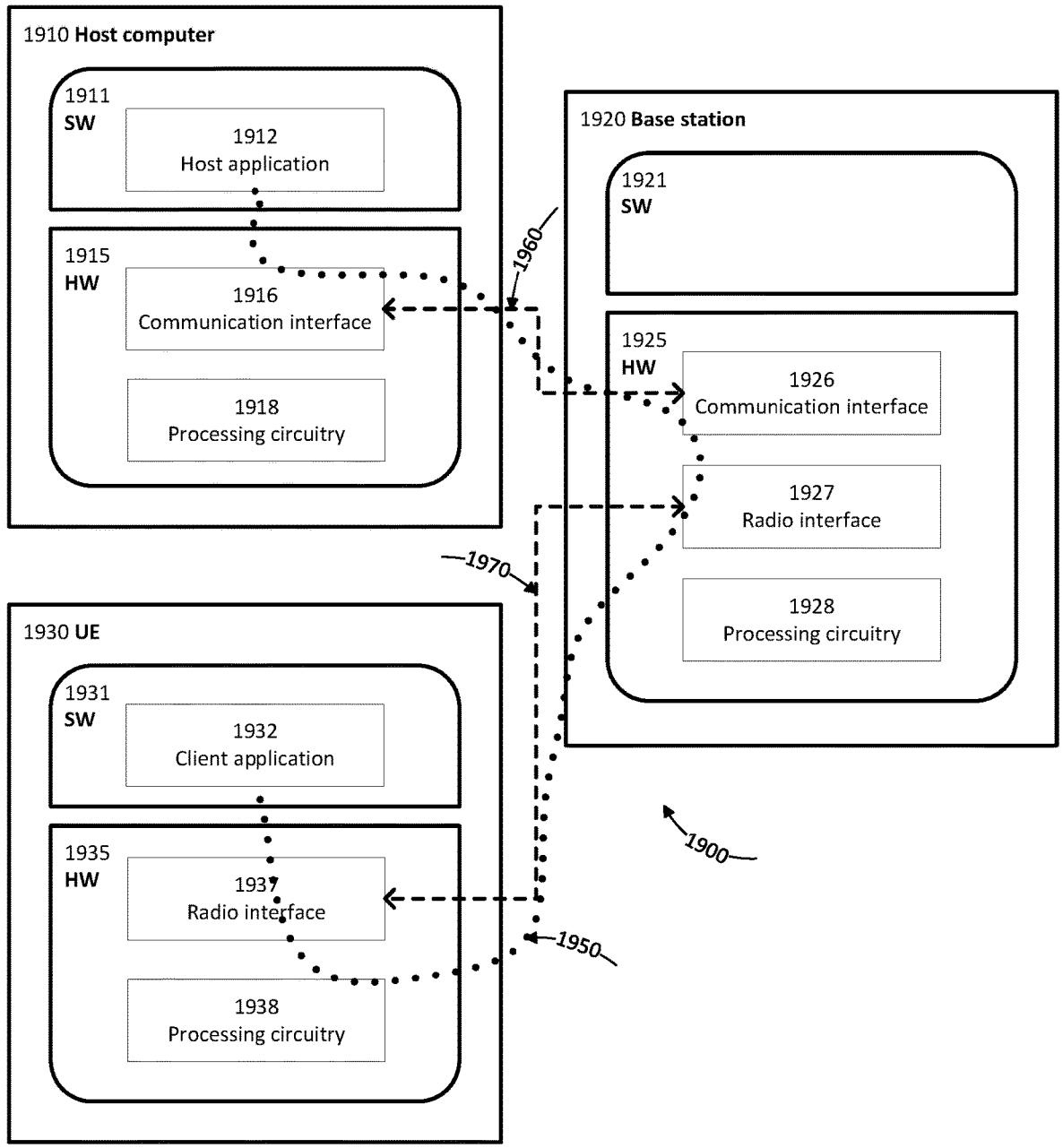
FIG. 19 is a block diagram of a host computer according to some embodiments.

Example implementations, in accordance with an embodiment, of the UE, base station and host computer discussed in the preceding paragraphs will now be described with reference to FIG. 19. FIG. 19 illustrates host computer communicating via a base station with a user equipment over a partially wireless connection in accordance with some embodiments In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct or it may pass through a core network (not shown in FIG. 19) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

It is noted that host computer 1910, base station 1920 and UE 1930 illustrated in FIG. 19 may be similar or identical to host computer 1830, one of base stations 1812*a*, 1812*b*, 1812*c* and one of UEs 1891, 1892 of FIG. 18, respectively. This is to say, the inner workings of these entities may be as shown in FIG. 19 and independently, the surrounding network topology may be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the teachings of these embodiments may improve the control signaling overhead and corresponding system resource availability which may be used for instance to increase data rates. Some teachings may thereby provide benefits such as reduced user waiting time and relaxed restriction on file size.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

Figure 20:
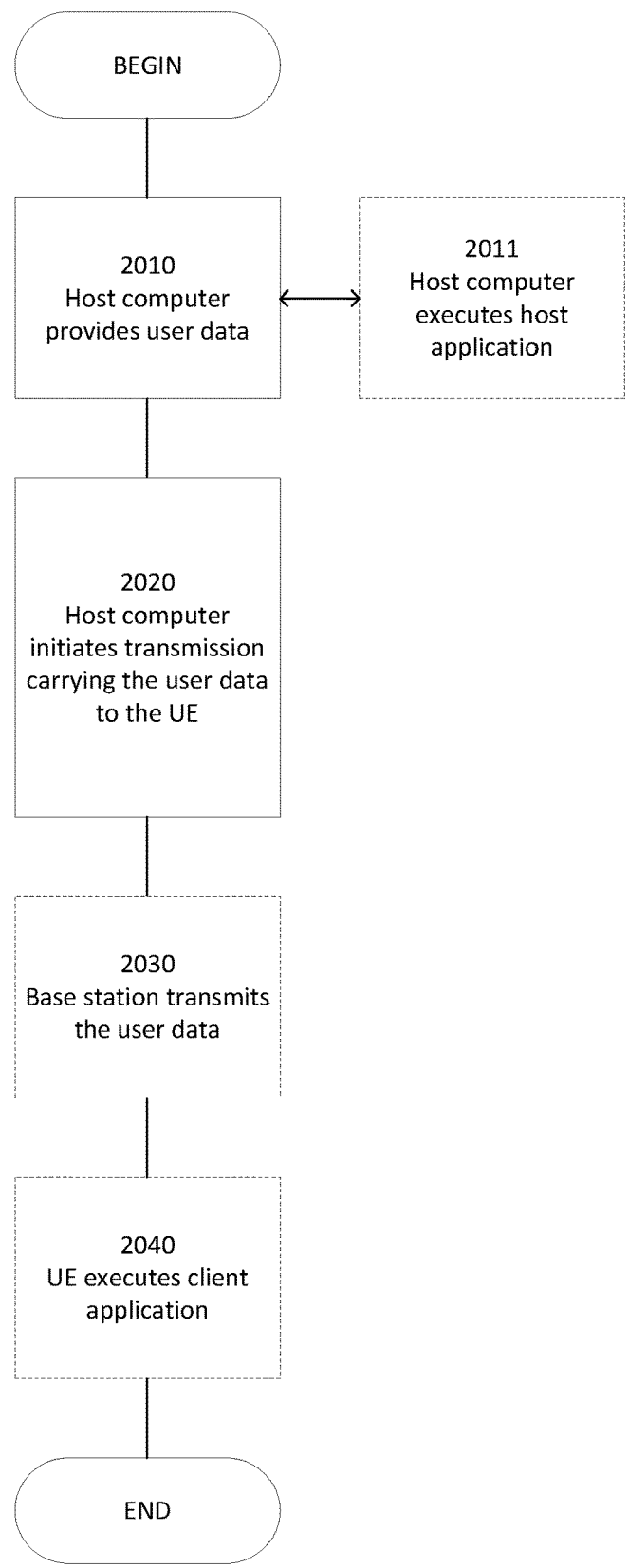
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

Figure 21:
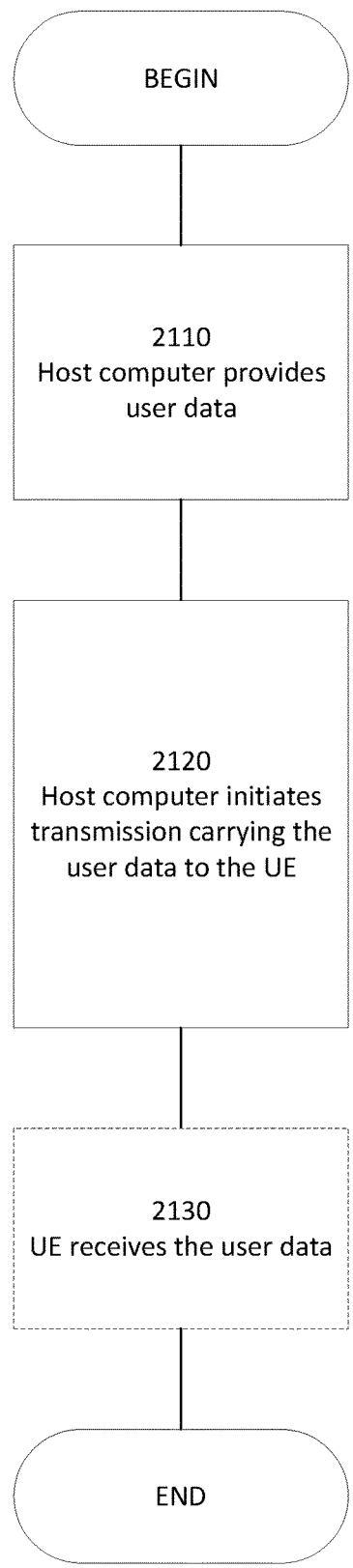
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

Figure 22:
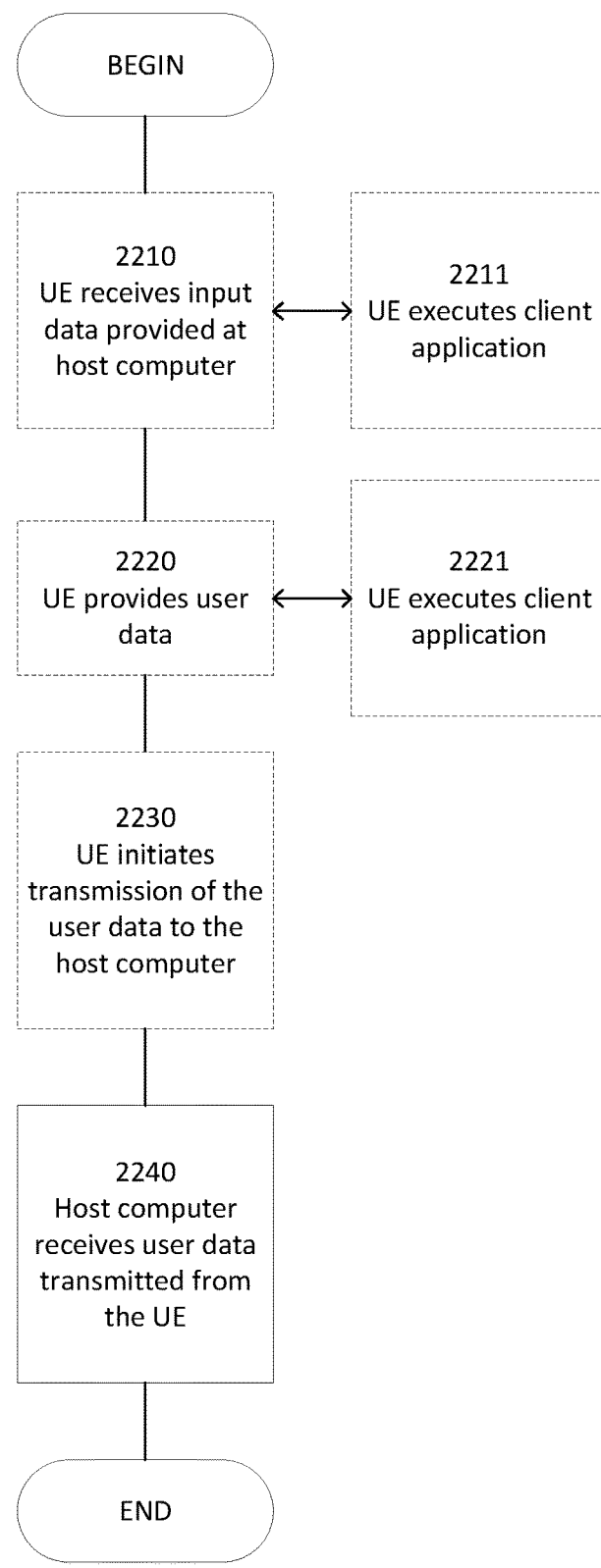
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

Figure 23:
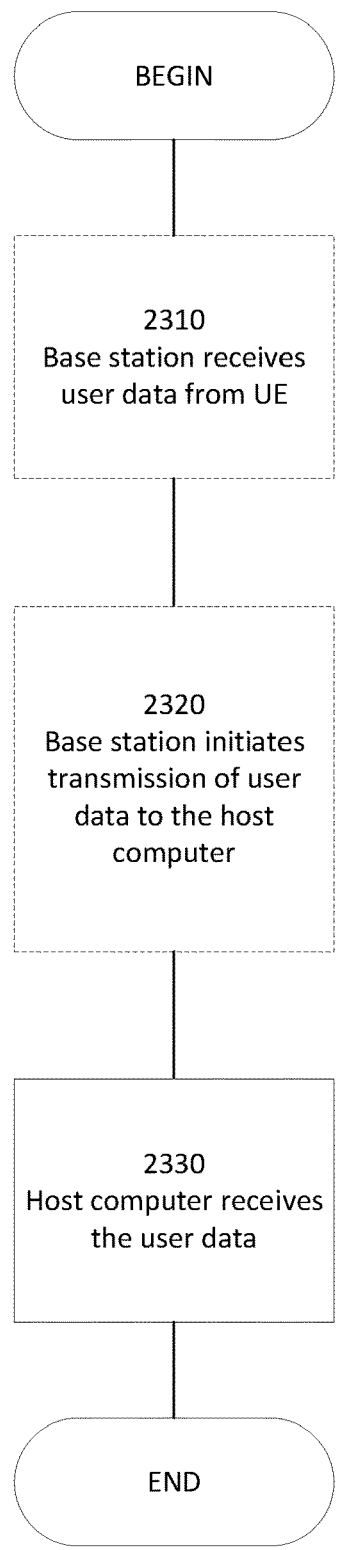
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A wireless device configured to report channel state information (CSI) feedback based on a CSI reference signal (CSI-RS) received on a CSI-RS resource of one or more CSI-RS ports, the wireless device comprising:
   communication circuitry; and
   processing circuitry configured to, if the wireless device is not configured with a parameter that indicates, for the CSI-RS resource, which sets of one or more CSI-RS port indices are associated with which transmission ranks, assume, for the CSI-RS resource, that certain sets of one or more CSI-RS port indices are associated with certain transmission ranks,
   wherein the parameter is a port indication parameter that indicates which ports in the CSI-RS resource are to be used for rank and Channel Quality Information calculation for non precoder matrix indicator (non-PMI) CSI feedback, wherein the processing circuitry is configured to, if the wireless device is not configured with the port indication parameter, assume, for each rank v of one or more supported transmission ranks, that a set of one or more CSI-RS ports associated with the rank v have one or more respective CSI-RS port indices of 0, . . . , v−1.

2. The wireless device of claim 1, wherein the processing circuitry is configured to assume, for each of one or more supported transmission ranks except the highest supported transmission rank, that a set of one or more CSI-RS port indices associated with the supported transmission rank is a proper subset of the set of one or more CSI-RS port indices associated with a higher supported transmission rank.

3. The wireless device of claim 1, wherein the processing circuitry is further configured to calculate a channel quality indicator (CQI) for a transmission rank, using the one or more CSI-RS ports assumed for that transmission rank for the CSI-RS resource.

4. The wireless device of claim 1, wherein the processing circuitry is further configured to:
select a transmission rank from a plurality of ranks and selecting a CQI calculated for that rank to report for the CSI-RS resource; and
transmit to a radio network node CSI feedback for the CSI-RS resource, wherein the CSI feedback includes the selected transmission rank and CQI.

5. The wireless device of claim 4, wherein the CSI feedback is non-precoder matrix indicator CSI (non-PMI CSI) feedback such that the CSI feedback does not indicate a PMI.

6. The wireless device of claim 4, wherein the processing circuitry is further configured to receive from the radio network node a data transmission whose transmission parameters are determined based on the CSI feedback and the one or more CSI-RS ports that are associated with the transmission rank included in the CSI feedback.

7. The wireless device of claim 1, wherein the one or more supported transmission ranks include ranks 1, 2, . . . , v, where v>2, wherein the processing circuitry is configured to assume that the CSI-RS port associated with rank 1 has a CSI-RS port index of 0, wherein the processing circuitry is configured to assume that the set of CSI-RS ports associated with rank 2 have respective CSI-RS port indices of 0 and 1, and wherein the processing circuitry is configured to assume that the set of CSI-RS ports associated with rank v have respective CSI-RS port indices of 0, 1, . . . , v−1.

8. A radio network node comprising:
communication circuitry; and
processing circuitry configured to:
transmit, to a wireless device, a channel state information reference signal (CSI-RS) on a CSI-RS resource of one or more CSI-RS ports;
receive from the wireless device channel state information, CSI, feedback based on the CSI-RS signal transmitted on the CSI-RS resource, wherein the CSI feedback includes a transmission rank and a channel quality indicator (CQI);
determine one or more CSI-RS ports in the CSI-RS resource that are assumed to be associated with the transmission rank included in the CSI feedback; and
if the wireless device is not configured with a port indication parameter that indicates which ports in the CSI-RS resource are to be used for rank and Channel Quality Information calculation for non precoder matrix indicator (non-PMI) CSI feedback, assuming, for each rank v of one or more supported transmission ranks, that a set of one or more CSI-RS ports associated with the rank v have one or more respective CSI-RS port indices of 0, . . . , v−1.

9. The radio network node of claim 8, wherein the processing circuitry is further configured to:
determine transmission parameters of a data transmission based on the CSI feedback; and
transmit the data transmission with the determined transmission parameters and on the one or more determined CSI-RS ports.

10. The radio network node of claim 8, wherein the processing circuitry is further configured to beamform the CSI-RS specifically for the wireless device.

11. The radio network node of claim 8, wherein the processing circuitry is further configured to determine a precoder for the CSI-RS from an uplink sounding reference signal received from the wireless device and apply the precoder to the CSI-RS.

12. The radio network node of claim 8, wherein the processing circuitry is further configured to determine, from an uplink sounding reference signal received from the wireless device, a number of the one or more CSI-RS ports of the CSI-RS resource on which to transmit the CSI-RS.

13. The radio network node of claim 8, wherein the CSI feedback is non-precoder matrix indicator CSI (non-PMI CSI) feedback such that the CSI feedback does not indicate a PMI.

14. The radio network node of claim 8, wherein the CSI-RS resource is dedicated to the wireless device and/or is aperiodically triggered.

15. The radio network node of claim 8, wherein, for each of one or more supported transmission ranks except the highest supported transmission rank, the one or more CSI-RS port indices in the CSI-RS resource that are assumed as associated with the supported transmission rank is a proper subset of one or more CSI-RS port indices in the CSI-RS resource that are assumed as associated with a higher supported transmission rank.

16. A method performed by a wireless device for reporting channel state information (CSI) feedback based on a CSI reference signal, CSI-RS, received on a CSI-RS resource of one or more CSI-RS ports, the method comprising:
if the wireless device is not configured with a parameter that indicates, for the CSI-RS resource, which sets of one or more CSI-RS port indices are associated with which transmission ranks, assuming, for the CSI-RS resource, that certain sets of one or more CSI-RS port indices are associated with certain transmission ranks, wherein the parameter is a port indication parameter that indicates which ports in the CSI-RS resource are to be used for rank and Channel Quality Information calculation for non precoder matrix indicator (non-PMI) CSI feedback; and
if the wireless device is not configured with the port indication parameter, assuming, for each rank v of one or more supported transmission ranks that a set of one or more CSI-RS ports associated with the rank v have one or more respective CSI-RS port indices of 0, . . . , v−1.

17. A method performed by a radio network node, the method comprising:
transmitting, to a wireless device, a channel state information reference signal (CSI-RS) on a CSI-RS resource of one or more CSI-RS ports;
receiving from the wireless device channel state information, CSI, feedback based on the CSI-RS transmitted on the CSI-RS resource, wherein the CSI feedback includes a transmission rank and a channel quality indicator (CQI);

determining one or more CSI-RS ports in the CSI-RS resource that are assumed to be associated with the transmission rank included in the CSI feedback; and if the wireless device is not configured with a port indication parameter that indicates which ports in the CSI-RS resource are to be used for rank and Channel Quality Information calculation for non precoder matrix indicator (non-PMI) CSI feedback, assuming, for each rank v of one or more supported transmission ranks, that a set of one or more CSI-RS ports associated with the rank v have one or more respective CSI-RS port indices of 0, . . . , v−1.

* * * * *